US008098408B2

(12) United States Patent
Sawada et al.

(10) Patent No.: US 8,098,408 B2

(45) Date of Patent: Jan. 17, 2012

(54) TWO-DIMENTIONAL CODE PRINTING APPARATUS AND METHOD AND TANGIBLE MEDIUM

(75) Inventors: Akihiro Sawada, Nagoya (JP); Akihiko Niwa, Toki (JP); Chitoshi Ito, Kasugai (JP); Minako Ishida, Nagoya (JP); Hideo Ueno, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1187 days.

(21) Appl. No.: 11/893,655

(22) Filed: Aug. 17, 2007

(65) Prior Publication Data

US 2008/0074697 A1 Mar. 27, 2008

(30) Foreign Application Priority Data

Sep. 27, 2006 (JP) ................................ 2006-261695

(51) Int. Cl.
*G06F 3/12* (2006.01)

(52) U.S. Cl. .. 358/3.28; 358/1.18; 358/453; 235/462.01

(58) Field of Classification Search ................. 358/1.15, 358/1.1, 3.28; 235/462.01, 462.08, 462.09, 235/462.1, 462.15
See application file for complete search history.

(56) References Cited

U.S. PATENT DOCUMENTS 4,875,174 A * 10/1989 Olodort et al. ................ 715/201
5,239,622 A * 8/1993 Best et al. .................... 358/1.18
5,395,173 A 3/1995 Ueno et al.
5,583,970 A * 12/1996 Strobel ........................ 358/1.15
5,857,789 A * 1/1999 Day et al. ................... 400/615.2
6,212,504 B1 * 4/2001 Hayosh ........................... 705/64
7,264,164 B2 * 9/2007 Sakai et al. .............. 235/462.01
7,690,581 B2 * 4/2010 Takei et al. ................... 235/494
7,823,784 B2 * 11/2010 Matsumoto .............. 235/462.01
2002/0080395 A1 * 6/2002 Kurashina .................... 358/1.15
2005/0012949 A1 * 1/2005 Kitahara et al. ............. 358/1.11
2005/0234835 A1 10/2005 Stonoha et al.
2006/0053137 A1 * 3/2006 Tanimoto ...................... 707/101

FOREIGN PATENT DOCUMENTS

| | | |
|---|---|---|
| EP | 0743614 | 11/1996 |
| EP | 0847865 | 6/1998 |
| JP | 5177898 | 7/1993 |
| JP | 10013690 | 1/1998 |
| JP | 10217548 | 8/1998 |
| JP | 2000-076372 | 3/2000 |
| JP | 2000090187 | 3/2000 |
| JP | 2001347733 | 12/2001 |
| JP | 2002-041504 | 2/2002 |
| JP | 2002-049885 | 2/2002 |
| JP | 2006-079304 | 3/2006 |
| JP | 2006236015 | 9/2006 |
| WO | 03/034329 | 4/2003 |

* cited by examiner

*Primary Examiner* — King Poon
*Assistant Examiner* — Lawrence Wills
(74) *Attorney, Agent, or Firm* — Day Pitney LLP

(57) ABSTRACT

A two-dimensional code printing apparatus includes a computer device and a tape printer. A print frame is arranged on a label making work area on an edit display screen displayed on the computer device. A user inputs a text into a text box arranged on the print frame, and then highlights the text to be coded in a two-dimensional code by a mouse, and then one-clicks a two-dimensional code button. Herewith, the text and the two-dimensional code are displayed on the text box. If the user clicks a print button, a label on which both the text and the two-dimensional code printed is printed.

20 Claims, 18 Drawing Sheets

TWO-DIMENTIONAL CODE PRINTING APPARATUS AND METHOD AND TANGIBLE MEDIUM

CROSS-REFERENCE TO RELATED APPLICATIONS

The present application claims priority from Japanese Patent Application No. 2006-261695, which was filed on Sep. 27, 2006, the disclosure of which is herein incorporated by reference in its entirety.

TECHNICAL FIELD

One or more aspects of the disclosure relate to a two-dimensional code printing apparatus and method and tangible medium, and more particularly to highlighting data for making a two-dimensional code before a printing process and making the two-dimensional code based on the highlighted data to be coded in the two-dimensional code.

BACKGROUND

Conventionally, barcodes, which are commonly goods codes, are printed on each of various goods. In Japan, especially, JAN (Japan Article Number) is common barcode as a source marking. Also, recently, two-dimensional codes are displayed on internet screen and printed on magazines and the like. The two-dimensional codes are used when cell phones read URL (Uniform Resource Locator). In Japan, the two-dimensional code is standardized as JIS X 0510 in JIS (Japanese Industrial Standards). Also, the two-dimensional code is standardized as ISO/IEC18004 in ISO (International Organization for Standardization).

Here, barcodes, which are commonly goods codes, are printed on each of above various goods, and printed barcodes are read from readers with the use of computers. Herewith, above various goods are managed by the barcode. Here, recently, to manage recording mediums including CD-ROM, DVD, or the like and books and the like, there are strong demands, which text is printed barcode or two-dimensional barcode in the same printing medium. However, above barcodes are printed by special barcode printers, so the user has to print the text, which is visible, by another printer. Accordingly, the visible text with the barcode is printed on another printing medium. Also, printing medium on which both barcode and visible text are printed is made by offset printing, so it is a problem from the point of view of the cost.

In a conventional example, a barcode printing apparatus prints barcode and desired text on selected position, and enhances versatility of barcode.

Above barcode printing apparatus are useful for the point that both barcode and visible text are printable on the same printing medium, and cost may be reduced. However, to print barcode and visible text on the same printing medium, concerning input of data, the visible text is input like a word processor, and data to be coded in barcode is input in switched barcode input mode. Accordingly, this input method is complex and the user has to consider alignment of text and barcode beforehand. Also, to code text which is already existed and data of a part of sentence in barcode, the user has to input all texts again and input data of barcode in the switched barcode input mode. Accordingly, this input method is also complex. Concerning the two-dimensional code, in the case where the user inputs data to print the two-dimensional code and visible text on the same printing medium, above problem will occur. Also, if the two-dimensional code is not within a width of the printing medium, or data amount of the desired text is not within the two-dimensional code, the user has to change a size and the number of the two-dimensional code every time above problem occurs.

SUMMARY

In view of the foregoing, one or more aspects of the disclosure relate to a two-dimensional printing apparatus, a two-dimensional printing method, and a computer readable medium having computer-executable instructions or the like that make a printing medium which two-dimensional code and visible are printed thereon. Also, one or more aspects of the disclosure, to make the label which the two-dimensional code and the text printed thereon, the user can input all data with the use of the keyboard (for example) as though the user operates a word processor, and width of the printing medium and data amount of text to be coded in the two-dimensional code are detected and a size and the number of the two-dimensional code to be coded are automatically determined. Accordingly, one or more aspects of the disclosure can make the printing medium which two-dimensional code and the visible text printed thereon. Also, one or more aspects of the disclosure, with the use of a portion of text data, which is already existed, the existed text data can be coded in the two-dimensional code by easily highlighting desired text to be coded in the two-dimensional code, and width of the printing medium and data amount of text to be coded in the two-dimensional code are detected and a size and the number of the two-dimensional code to be coded are automatically determined. Accordingly, one or more aspects of the disclosure can make the printing medium which two-dimensional code and the visible text printed thereon.

To achieve the above object, according to a first aspect of the disclosure, there is provided a two-dimensional code printing apparatus comprising: a display device; an input device that inputs various characters, numbers, symbols, or instructions; an input data storage device that stores data corresponding to the various characters, numbers, or symbols which are input by the input device; a first display controller that displays the various characters, numbers, or symbols corresponding to the data stored in the input data storage device on the display device; a selection device that selects desired portion of the displayed characters, numbers or symbols displayed on the display device based on the input instructions input by the input data device; a two-dimensional code conversion device that converts the selected characters, numbers, or symbols by the selection device into a two-dimensional code; a transformed data storage device that stores data corresponding to not selected characters, numbers, or symbols by the selection device and data corresponding to the converted two-dimensional code by the two-dimensional code conversion device; a second display controller that displays the characters, numbers, symbols, and the two-dimensional code corresponding to the stored data in the transformed data storage device on the display device; and a printer that prints the characters, numbers, symbols, and the two-dimensional code corresponding to the stored data in the transformed data storage device on a printing medium.

And, according to a second aspect of the disclosure, there is also provided A two-dimensional code printing apparatus comprising: a display device; an input device that inputs various characters, numbers, symbols, or instructions; an input data storage device that stores data corresponding to the various characters, numbers, and symbols which are input by the input device; a transformed data storage device that stores data corresponding to the various characters, numbers, or symbols and data corresponding to one or more two-dimensional codes; and a processor programmed to: (a) store the data corresponding to the various characters, numbers, and symbols which are input by the input device in the input data storage device, (b) display the various characters, numbers, and symbols corresponding to the data stored in the input data storage device on the display device, (c) select desired portion of the displayed characters, numbers, or symbols displayed on the display device based on the input instruction which is input by the input device, (d) convert the selected characters, numbers, or symbols into the two-dimensional code, (e) store data corresponding to not selected characters, numbers, and symbols and data corresponding to the converted two-dimensional code device in the transformed data storage device, (f) display the stored characters, numbers, symbols, or two-dimensional code corresponding to the stored data in the transformed data storage device, and (g) print the stored characters, numbers, symbols, or two-dimensional code corresponding to the stored data in the transformed data storage device on a printing medium by a printer.

In the above two-dimensional code printing apparatuses, the user can input all data with the use of an input device (for example, a keyboard) as though the user operates a word processor, and then, the user highlights desired text to be coded in a two-dimensional code among a portion of a displayed text displayed on a display device (for example, a liquid crystal display) by easily operation with the use of a input device (for example, a mouse), and then printing medium which the two-dimensional code and visible text printed thereon will be made. Also, with the use of a portion of text data, which is already existed, the existed text data can be coded in the two-dimensional code by easily highlighting desired text to be coded in the two-dimensional code, and then printing medium which the two-dimensional code and visible text printed thereon will be made.

Accordingly, the first and second aspects of the disclosure an solve the problem of complex input method, which the user has to input the text to be printed with the two-dimensional code like the word processor and the user has to input data to be coded in the two-dimensional code in switched the two-dimensional code input mode. Also, the first and second aspects of the disclosure can solve the problem of botheration, which the user has to consider alignment of the text and the two-dimensional code. Also, the first and second aspects of the disclosure can solve the problem of complex input method, which to code the part of the text which is already existed, the user has to input all text again and input data to be coded in the two-dimensional code in switched the two-dimensional code input mode.

According to a third aspect of the disclosure, there is also provided a two-dimensional code printing method comprising: a receiving step that receives various characters, numbers, symbols, or instructions, a first storing step that stores data corresponding to the received characters, numbers, or symbols in an input data storage device; a first displaying step that displays the various characters, numbers, or symbols corresponding to the data stored in the input data storage device on a display device; a selecting step that selects the displayed characters, numbers, or symbols displayed on the display device; a converting step that converts the selected characters, numbers, or symbols in the selecting step into a two-dimensional code; a second storing step that stores data corresponding to not selected characters, numbers, or symbols in the selecting step and data corresponding to the converted two-dimensional code in a transformed data storage device; a second displaying step that displays the characters, numbers, symbols, and the two-dimensional code corresponding to the stored data in the transformed data storage device on the display device; and a printing step that prints the characters, numbers symbols, and the two-dimensional code corresponding to the stored data in the transformed data storage device on a printing medium.

In the above two-dimensional code printing method, the user can input all data with the use of an input device 6 (for example, a keyboard) as though the user operates a word processor, and then, the user highlights desired text to be coded in a two-dimensional code among a portion of a displayed text displayed on a display device (for example, a liquid crystal display) by easily operation, and then printing medium which the two-dimensional code and visible text printed thereon will be made. Also, with the use of a portion of text data, which is already existed, the existed text data can be coded in the two-dimensional code by easily highlighting desired text to be coded in the two-dimensional code, and then printing medium which the two-dimensional code and visible text printed thereon will be made.

Accordingly, the third aspect of the disclosure an solve the problem of complex input method, which the user has to input the text to be printed with the two-dimensional code like the word processor and the user has to input data to be coded in the two-dimensional code in switched the two-dimensional code input mode. Also, the first and second aspects of the disclosure can solve the problem of botheration, which the user has to consider alignment of the text and the two-dimensional code. Also, the first and second aspects of the disclosure can solve the problem of complex input method, which to code the part of the text which is already existed, the user has to input all text again and input data to be coded in the two-dimensional code in switched the two-dimensional code input mode.

According to a fourth aspect of the disclosure, there is also provided a tangible computer-executable medium having instructions stored thereon that, when executed by a processor, perform a method comprising the steps of: a receiving step that receives various characters, numbers, symbols, or instructions, a first storing step that stores data corresponding to the received characters, numbers, or symbols in an input data storage device; a first displaying step that displays the various characters, numbers, or symbols corresponding to the data stored in the input data storage device on a display device; a selecting step that selects the displayed characters, numbers, or symbols displayed on the display device; a converting step that converts the selected characters, numbers, or symbols in the selecting step into a two-dimensional code, a second storing step that stores data corresponding to not selected characters, numbers, or symbols in the selecting step and data corresponding to the converted two-dimensional code in a transformed data storage device; a second displaying step that displays the characters, numbers, symbols, and the two-dimensional code corresponding to the stored data in the transformed data storage device on the display device; and a printing step that prints the characters, numbers symbols, and the two-dimensional code corresponding to the stored data in the transformed data storage device on a printing medium.

In the above tangible computer-executable medium code printing method, the user can input all data with the use of an input device 6 (for example, a keyboard) as though the user operates a word processor, and then, the user highlights desired text to be coded in a two-dimensional code among a portion of a displayed text displayed on a display device (for example, a liquid crystal display) by easily operation, and then printing medium which the two-dimensional code and visible text printed thereon will be made. Also, with the use of a portion of text data, which is already existed, the existed text data can be coded in the two-dimensional code by easily highlighting desired text to be coded in the two-dimensional code, and then printing medium which the two-dimensional code and visible text printed thereon will be made.

Accordingly, the fourth aspect of the disclosure an solve the problem of complex input method, which the user has to input the text to be printed with the two-dimensional code like the word processor and the user has to input data to be coded in the two-dimensional code in switched the two-dimensional code input mode. Also, the first and second aspects of the disclosure can solve the problem of botheration, which the user has to consider alignment of the text and the two-dimensional code. Also, the first and second aspects of the disclosure can solve the problem of complex input method, which to code the part of the text which is already existed, the user has to input all text again and input data to be coded in the two-dimensional code in switched the two-dimensional code input mode.

BRIEF DESCRIPTION OF THE DRAWINGS

The accompanying drawings, which are incorporated in and constitute a part of this specification illustrate embodiments of the disclosure and, together with the description, serve to explain the objects, advantages and principles of the disclosure.

DETAILED DESCRIPTION

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

Aspects of the disclosure are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the disclosure may be embodied in a JAVA-based application or the like that runs in a processor or processors. Further, the terms "CPU" and "processor" are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). It is contemplated that one or more aspects of the disclosure may be implemented as computer executable instructions on a computer readable medium such as a non-volatile memory, a magnetic or optical disc. Further, one or more aspects of the disclosure may be implemented with a carrier signal in the form of, for instance, an audio-frequency, radio-frequency, or optical carrier wave.

A two-dimensional code printing apparatus 1 according to the disclosure will be described in detail with reference to the drawings based on an embodiment embodying one or more aspects of the disclosure.

Figure 1:
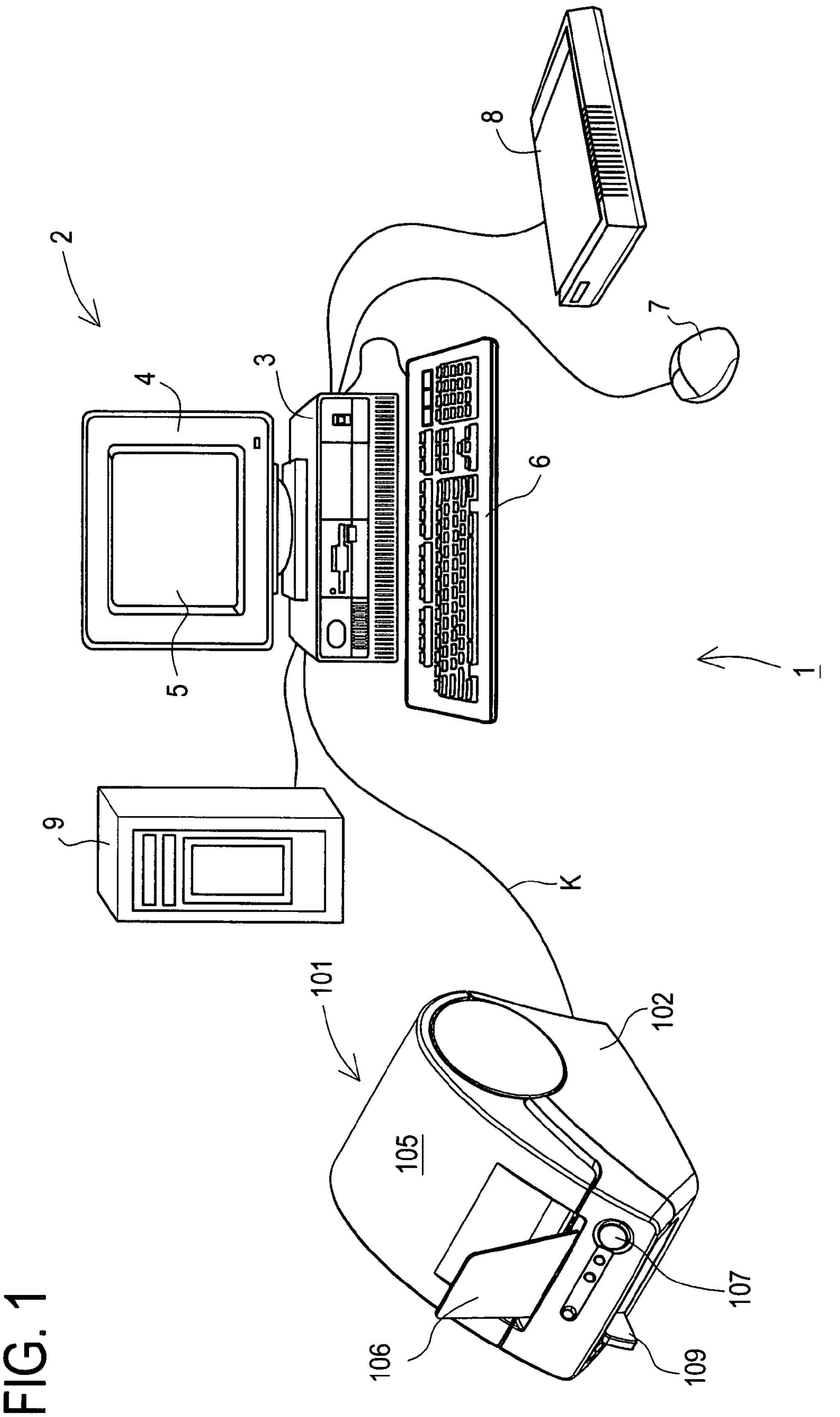
FIG. 1 is a schematic perspective view of a two-dimensional code printing apparatus in accordance with one or more aspects of the disclosure.

At first, a schematic structure of the two-dimensional code printing apparatus 1 of the embodiment will be described with reference to FIG. 1. FIG. 1 is a schematic perspective view of the two-dimensional code printing apparatus of the embodiment. As shown in FIG. 1, the two-dimensional code apparatus of the embodiment includes a computer device 2 and a tape printer 101. The computer device is constructed from a personal computer or the like. The computer device 1 and the tape printer 101 are interconnected via a signal cable K. The computer device 2 includes a host controller 3, a display device 4 (such as CRT, LCD, plasma display or the like), a keyboard 6, a mouse 7, an image scanner 8, and a CD-RW drive 9. Here, a joystick and/or trackball or the like may be used in place of or in conjunction with the mouse 7. Also, a MO drive and/or DVD drive or the like may be used in place of or in conjunction with the CD-R/W drive 9.

Figure 2:
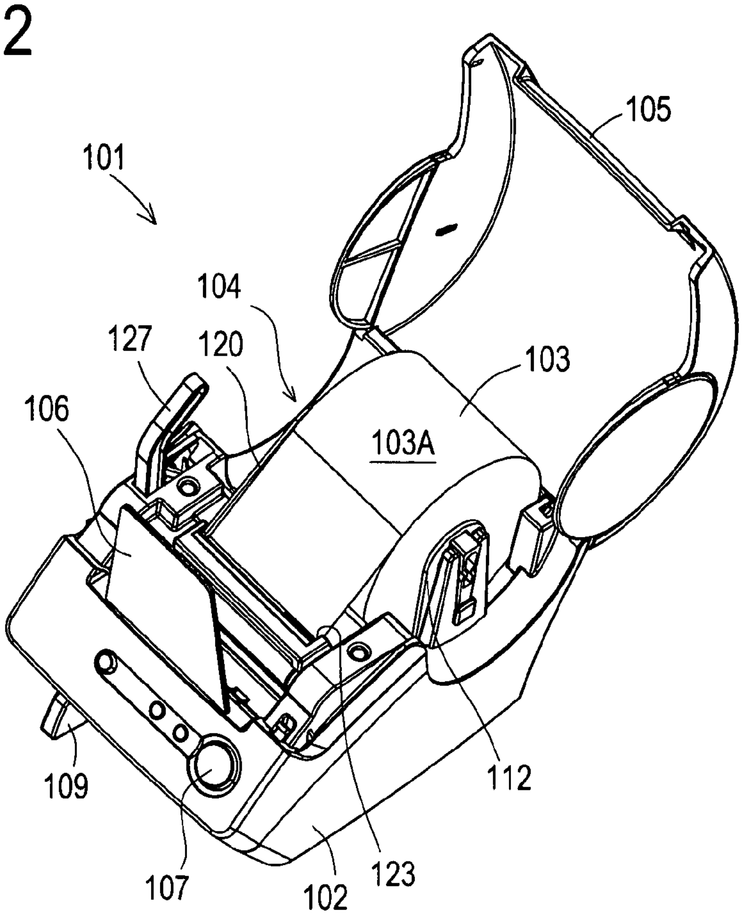
FIG. 2 is a perspective view of a tape printer in accordance with one or more aspects of the disclosure, in which a printing medium holder is mounted.
Figure 3:
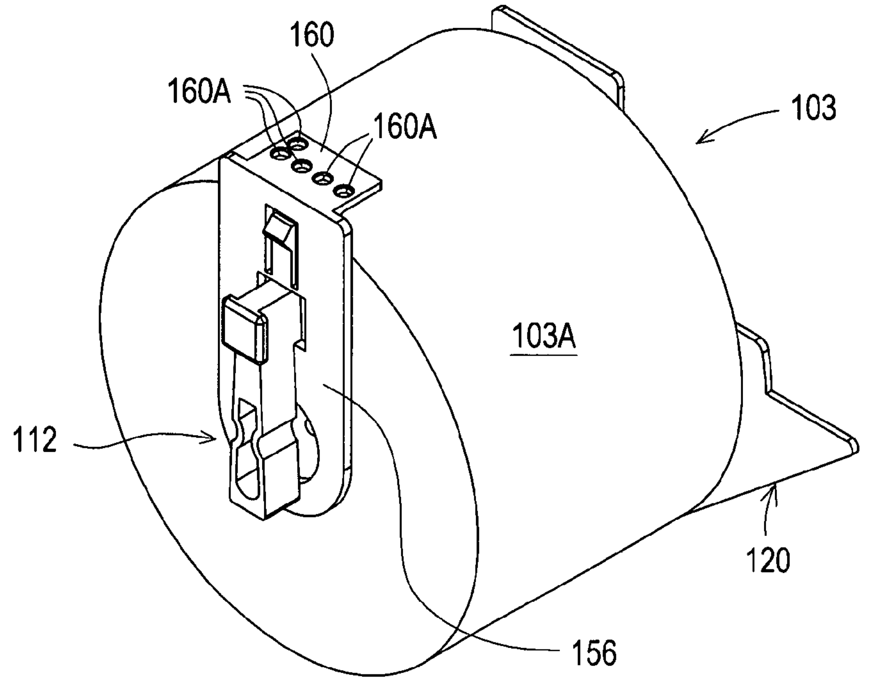
FIG. 3 is an illustration diagram of the printing medium holder in accordance with one or more aspects of the disclosure, in which a printing medium is mounted.
Figure 4:
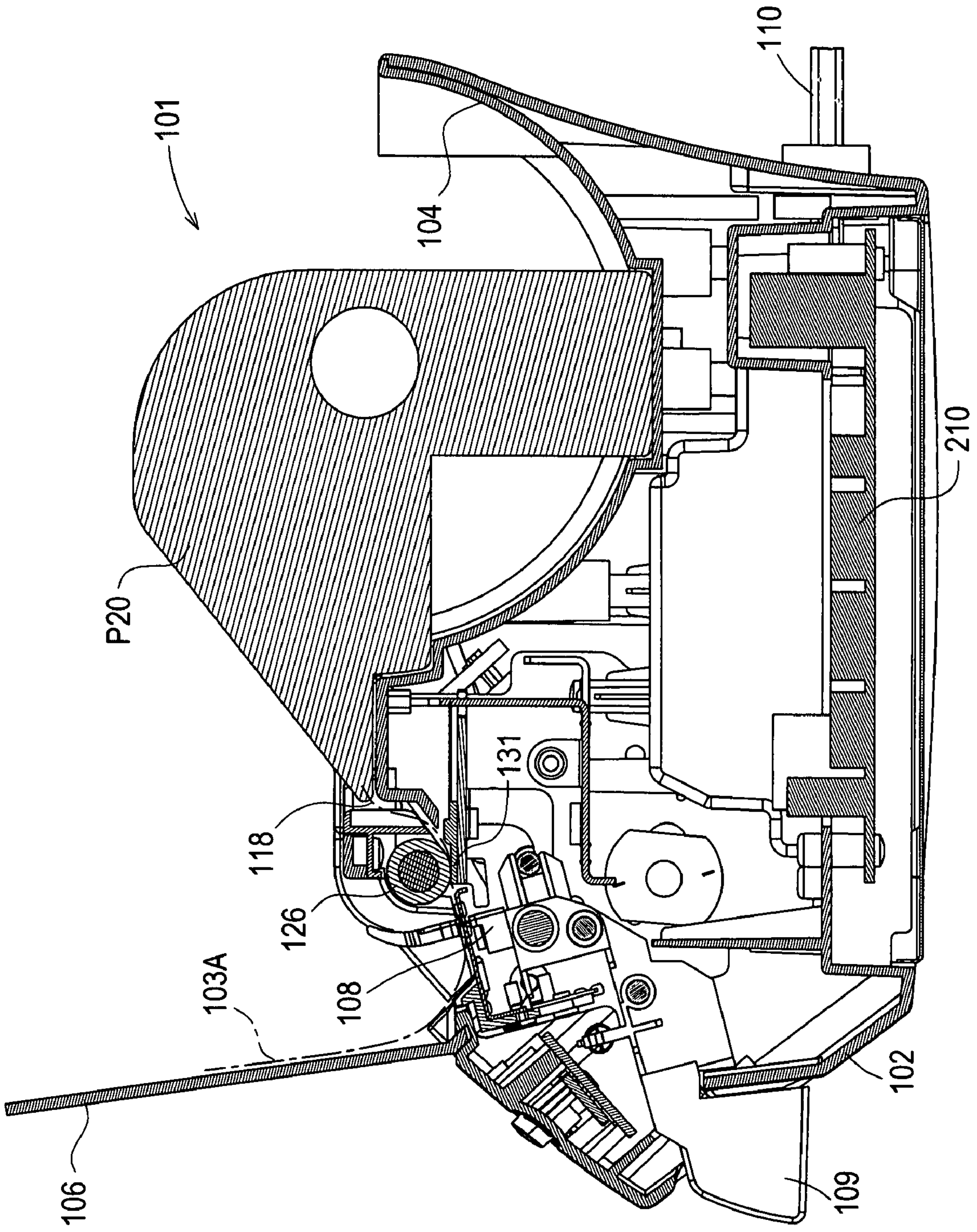
FIG. 4 is a sectional view of the tape printer in accordance with one or more aspects of the disclosure, in which the printing medium holder is mounted, and from which a top cover is removed.

The tape printer 101 will be described with reference to FIG. 1 to 4. FIG. 2 is a perspective view of the tape printer in which a printing medium holder is mounted. FIG. 3 is an illustration diagram of the printing medium holder in which a roll printing medium is mounted. FIG. 4 is a sectional side view of the tape printer 101 in which the printing media holder is mounted and a cover is removed.

The printing medium holder 103, which the roll printing medium 103A wound thereon, is mounted on the tape printer 101 shown in FIGS. 1 and 2. The roll printing medium 103A holds therein a long adhesive-backed tape of a predetermined width or less (approximately 62 mm or less in the embodiment). The tape printer prints on the roll printing medium 103A, and produces an adhesive label on which desired characters and the like are printed based on a print command from the computer device 2.

As shown in FIG. 1 and FIG. 2, the tape printer 101 includes a housing 102, a top cover 105, a tray 106, a power button 107, and a cutter lever 109. The top cover 5 may be made of transparent resin attached to the housing 102 with freely opened and closed. The top cover 105 covers an upper part of a printing medium holder storage portion 104 (see FIG. 4). The printing medium holder 103 holding a roll printing medium 103A with predetermined width 103A may be mounted on the printing medium holder storage part 4. The tray 106 is made of transparent resin disposed in a standing position to face to a substantially front center of the top cover 105. The power button 107 is placed in front of the tray 106. A cutter unit 108 may move from side to side based on the cutter lever 9. The housing 102 is provided on the back face near the other corner with a connector part (not shown) such as a USB (Universal Serial Bus) which is connected to for example a personal computer not shown. The roll printing medium 103A is made of a continuous thermal paper having self-coloring property, MKP paper (made of PET and having thermal layer on its back side), or precut label which circle or rectangle are positioned thereon in series. The roll printing medium 103A is wound on a cylindrically shaped core (not shown).

The top cover 105 is made of transparent resin, which makes it easy for users to visual recognize the type of the roll printing medium 103A wrapping the printing medium holder storage portion 104. The tray 6 made of transparent resin is standing position to face to a substantially front center of the top cover 105, the roll printing medium 103A having desired text will be discharged onto the tray 6 based on a print command from the computer device 2. If the cutter lever 109 is turned down, printed roll printing medium 103A will be cut and label with adhesive will be made up. Here, the cutter lever 109 is positioned at front-side portion and moves the cutter unit 108 (see FIG. 8) right and left.

On an extended portion 156 of a positioning holding member 112 (which will be described later) of the printing medium holder 103 which the roll printing medium 103A is wound thereon, a printing medium discrimination portion 160 is arranged. The printing medium discrimination portion 160 extends inward at a right angle in predetermined length, and is nearly rectangle in shape. Each sensor hole 160A is arranged at the positions facing to the sheet discrimination sensors MS1 to MS5 (see FIG. 6) on the printing medium discrimination portion 160. Here, in FIG. 3, five sensor holes 160A are arranged on predetermined positions based on the type of the mounted roll printing medium 103A. In each of the printing medium discrimination sensors MS1 to MS5, the plunger usually protrudes, and each of the micro-switch thereof is in an OFF state. In the case where each of the sensor holes 160A of the printing medium discrimination portion 160 is located at the positions corresponding to each of the printing medium discrimination sensors MS1 to MS5, the plunger is not depressed, the micro-switch is in an OFF state, and the off signal is output. On the other hand, in the case where each of the sensor holes 160A of the printing medium discrimination portion 160 is not located at the positions corresponding to each of the printing medium discrimination sensors MS1 to MS5, the plunger is depressed, the micro-switch is in an ON state, and the on signal is output.

As shown in FIGS. 2 and 4, a line thermal head 131 may be arranged inside the housing 102 (see FIG. 4). The line thermal head 131 is used to print the roll printing medium 103A mounted on the printing medium holder storage portion 104. An opening 118 may be arranged front of the line thermal head 131. The opening 118 is used to guide tip of the roll printing medium 103A to the line thermal head 131. A lever 127 is arranged at the front-end in feeding direction of one side-end of the printing medium holder storage portion 104. The lever 127 moves the line thermal head 131 up and down.

In above construction, the user attaches the printing medium holder 103 to the printing medium holder storage portion 104. And then, while the lever 27 is in an up position, one side edge of the roll printing medium 103A is in contact with the inner surface of a guide member 120 (see FIGS. 3 and 4) arranged on the printing medium holder 103 and the roll printing medium 103A is pulled out. And then, other side edge is inserted into the insertion portion 118 in contact with the guide rib 123 provided at the side end of the insertion port 118.

When the lever 127 is moved to down, the roll printing medium 103A is positioned at a standard position which side edge of the positioning holding member 112 is positioned at side of the guide rib 123 of the insertion portion 118 when the printing medium holder 103 is mounted on the printing medium holder portion 104. And, the tip of the roll printing medium 103A is pressed by the line thermal head 131 toward the platen roller 126 arranged at the position facing to the line thermal head 131, the tape printer 101 is placed in a printing enabled state.

A control circuit portion 210 is arranged under the printing medium holder storage portion 104. The printing medium holder storage portion 104 drive-controls each mechanical part based on instructions from the external computer device 2. The roll printing medium 103A is fed and image data is printed on a print surface of the roll printing medium 103A while the platen roller 126 is rotary driven by a printing medium feeding motor 219 (see FIG. 6) and the line thermal head 131 is drive-controlled. The roll printing medium 103A discharged onto the tray 6 is cut by the cutter unit 108 when the user moves the cut lever 109 rightward in FIG. 2.

The tape printer 101 receives various commands from the computer devices 2 via a communication interface (I/F) 218, and executes various processes based on the received commands. The various commands include the print command, a request command for type of medium. The printing command instructs the tape printer 101 to print and make the label. The request command for type of medium instructs the tape printer 101 to send the type of the roll printing medium 103A.

If a CPU 211 of the tape printer 101 determines that the print command is received, the CPU 211 will print on mounted roll printing medium 103A based on dotted pattern data. The dotted pattern data is included from the print command and represents bit map images.

If the CPU 211 of the tape printer 101 determines that the request command for type of medium is received, the CPU 211 will send a type of roll printing medium 103A mounted on the tape printer 101 to the computer device 2 which sent the request command for type of medium via the communication interface (I/F) 218.

Figure 5:
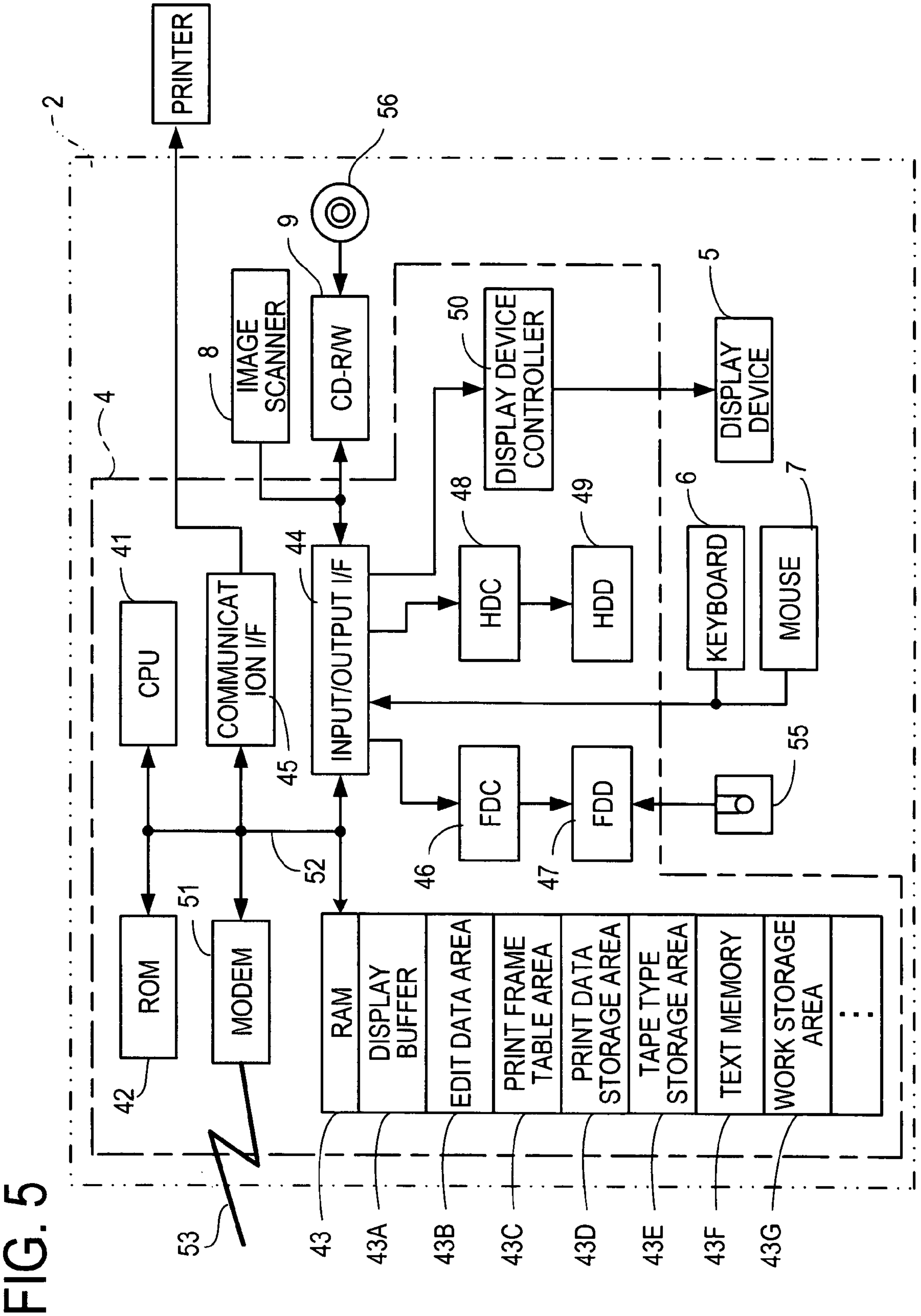
FIG. 5 is a circuit block diagram of main parts of a computer device making up the two-dimensional code printing apparatus in accordance with one or more aspects of the disclosure.

A circuit construction of the computer device 2 making up the two-dimensional code printing apparatus 1 will be described with reference to FIG. 5. FIG. 5 is a circuit block diagram of a substantial part of the computer device making up the two-dimensional code printing apparatus of the embodiment. As shown in FIG. 5, a host controller 3 of the computer device 2 includes a CPU 41, a ROM 42, a RAM 43, an input/output interface (I/F) 44, a communication interface (I/F) 45, a disc controller (DC) 46, a disc drive (DD) 47, a hard disc controller (HDC) 48, a hard disc drive (HDD) 49, a display controller 50, a modem 51, and the like. The CPU 41, the ROM 42, the RAM 43, the input/output I/F 44, the communication I/F 45, and the modem 51 are interconnected via a bus line 52, whereby intercommunication of data is performed. The DD 47 and HDD 49 are connected to the input/output I/F 44 via the DC 46 controlling the DD 47 and the HDC 48 controlling the HDD 49 respectively. The display controller 50 is connected to the input/output I/F 44. A telephone line 53 is connected to the modem 51.

The keyboard 6, the mouse 7, the image scanner 8 and the CD-RW drive 9 are connected to the host controller 4. The keyboard 6 is used when the user enters characters and symbols through the input/output I/F 44. The mouse 7 is used when the user inputs a coordinate of a display screen on the display device 4. The image scanner 8 is used when the user captures visible outline data and the like from drawings. The CD-RW drive 9 is used when the user writes into and reads from a CD-ROM 56, printing data and a print control program, and the like. The display 5 is connected to the host controller 3 via the display device controller 50. The display 5 displays the edit display screen (see FIG. 7). The tape printer 101 is connected to the host controller 3 via the communication I/F 45 and the signal cable K1.

The CPU 41 controls the whole computer device 2, and manages the all data on the operation of the computer device 2. The ROM 42 stores a startup program for booting the computer device 2 at power-on, which is in common with general personal computers.

The RAM 43 temporarily stores different types of data when the CPU 41 performs various kinds of control. The RAM 43 has a display buffer 43A, a edit data storage area 43B, a print frame table storage area 43C, a print data storage area 43D, a tape type storage area 43E, a text memory 43F, and work storage area 43G. Display images to be displayed on the screen 5 of the display device 4 are stored in the display buffer 43A. Edit data, which is basis of print image of a label, is stored in the edit data storage area 43B. Print frames (which will be described later), which indicate a border of a label among the edit data, are stored in the print frame storage area 43C. Print data, which is to be sent to the tape printer 101, is made in the print data storage area 43D. The type of tape mounted on the tape printer 101 is stored in the tape type storage area 43E. The text which is input from the keyboard and the like is stored in the text memory 43F. Various setting values and parameters are stored in the work storage area 43G.

The communication I/F 45 is composed of, for instance, USB (Universal Serial Bus) interface, Centronics interface, or the like. The communication I/F 45 allows interactive data communications with the tape printer 101 and an external electronic device (such as a computer and a laser printer).

The hard disc mounted on the HDD 49 stores an operating system (OS). In addition, the hard disc also stores communication programs for data communications with the tape printer 101 and the external electronic equipment, application programs such as a word processing software executable in the OS and a data creating software for printing, as required. The hard disc further stores a print data make/edit process program of one or more aspects of the disclosure. Data bases and templates and the like are read from and stored in the CD-ROM 56. The data bases store data files composed of various label data stored in the CR-ROM 56. The templates correspond to frames based on the print area of the roll printing medium 103A.

A disk 55 which is easy to be inserted in or removed from the DD 47 stores a variety of data obtained by the print data make/edit process and the like.

CD-ROM 56 which is easy to be inserted in or removed from the CD-RW drive 9 stores control programs of the template data make/edit process, data bases which stores data file composed of various type of the label data, and various templates in which a plurality of print-area frames are previously laid out corresponding to the print area of the print tape 103A, which will be send to various two-dimensional-code printing apparatuses.

Figure 6:
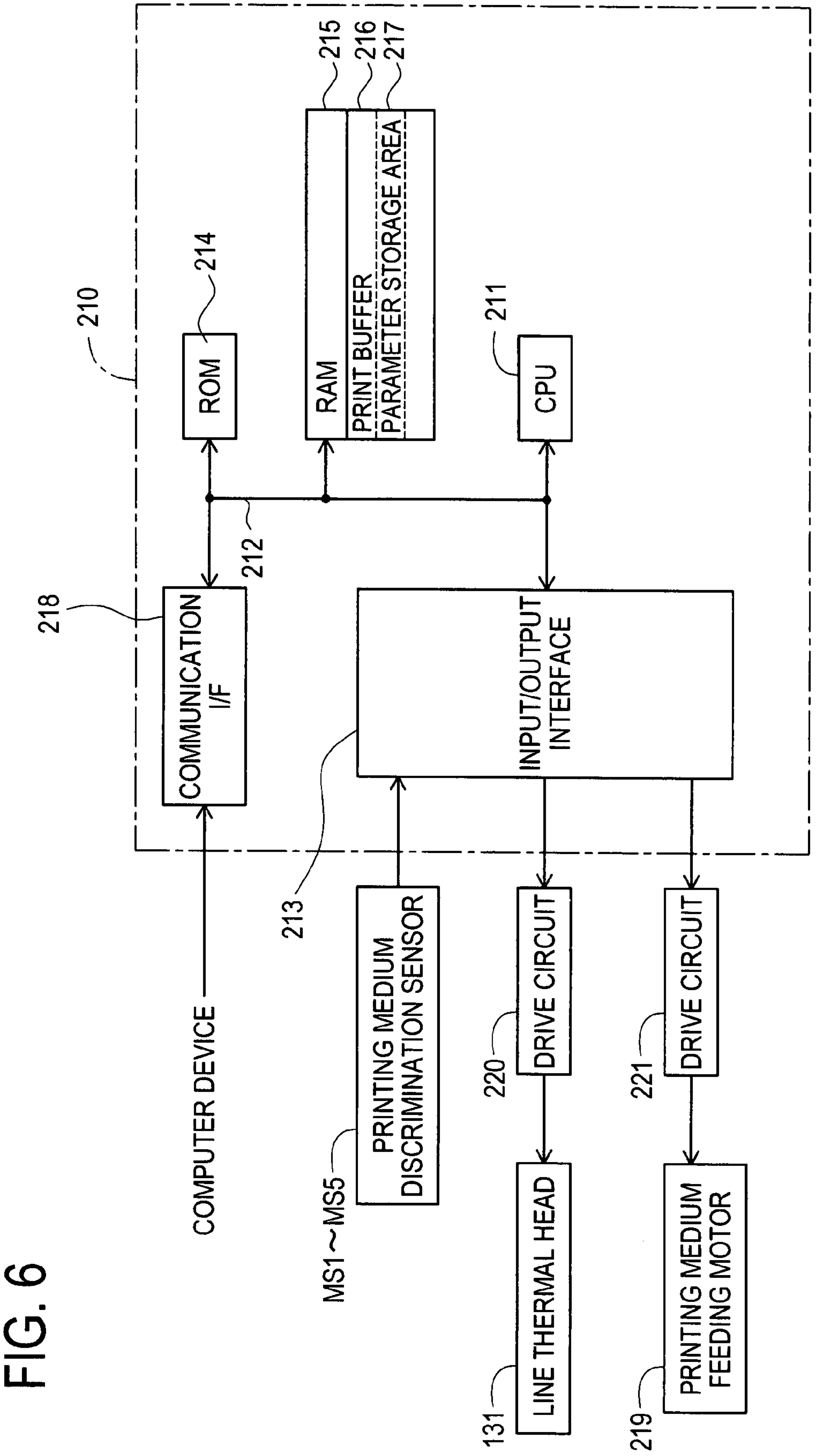
FIG. 6 is a circuit block diagram of main parts of the tape printer making up the two-dimensional code printing apparatus in accordance with one or more aspects of the disclosure.

A circuit construction of the tape printer 101 of the two-dimensional printing apparatus 1 will be described with reference to FIG. 6. FIG. 6 is a circuit block diagram which shows a circuit construction of substantial part of the tape printer making up the two-dimensional code printing apparatus of the embodiment. The control system of the tape printer 101 is composed of the control circuit portion 210 arranged on the control board (not shown). The control circuit is a core of the control system of the tape printer 101. The control circuit portion 210 is composed of the CPU 211, input/output interface 213, a ROM 214, a RAM 215, and the communication I/F 218. The CPU 211 controls various devices. The input/output interface 213 is connected the CPU 211 via a bus 212.

Various programs which are necessary for controls of the tape printer 101 include a printing drive control program and a pulse count determination program. The printing program is used to drive the line thermal head 131 and the printing medium feeding motor 210 with correct drive current corresponding to the information of the roll printing medium 103A detected by the printing medium discrimination sensors MS1 to MS5 based on the print data which is read from the print buffer which is described later. Here, the print data is input by the computer device 2 and stored in the print buffer. The pulse count corresponding to energy of each print dot to be made is determined based on the pulse count determination program.

The CPU 211 executes various operations based on the various programs stored in the ROM 214.

The RAM 215 includes a print buffer 216 and a parameter storage area 217. Print data, which is dotted pattern data format, included from the printing command input from the computer device 2 may be stored in the print buffer 216. The line thermal head 131 dot-prints based on the dotted pattern data stored in the print buffer 216. Various operation data is stored in the parameter storage area 217.

The printing medium discrimination sensors MS1 to MS5, a drive circuit 220, and drive circuit 221 are connected to the I/O interface 213. The printing medium discrimination sensors MS1 to MS5 detect information to drive a printing medium feeding motor 219 with correct drive current. A drive circuit 220 drives the line thermal head 131. The drive circuit 211 drives the printing medium feeding motor 219 with correct drive current corresponding to the information of the roll printing medium 103A detected by the printing medium discrimination sensors MS1 to MS5.

The communication interface (I/F) 218 connected to the bus line 212 may be composed of USB (Universal Serial Bus) interface, Centronics interface, or the like. The communication interface (I/F) 218 can two-way data communicate with the computer device 2. Consequently, if the print command is input by the computer device 2 via the communication I/F 218, print data included from the print command will be stored in the print buffer 216. At the same time, the line thermal head 131 will be driven via the drive circuit 220, and will print the dotted pattern data stored in the print buffer 216. In sync with above, the printing feeding motor 219 controls the feeding of roll printing medium 103 with appropriate driving current via the drive circuit 221. When each hating element is selective driven based on a line of printing dot via the drive circuit 220, the line thermal head 131 prints text and the like on the roll printing medium 103A.

Figure 7:
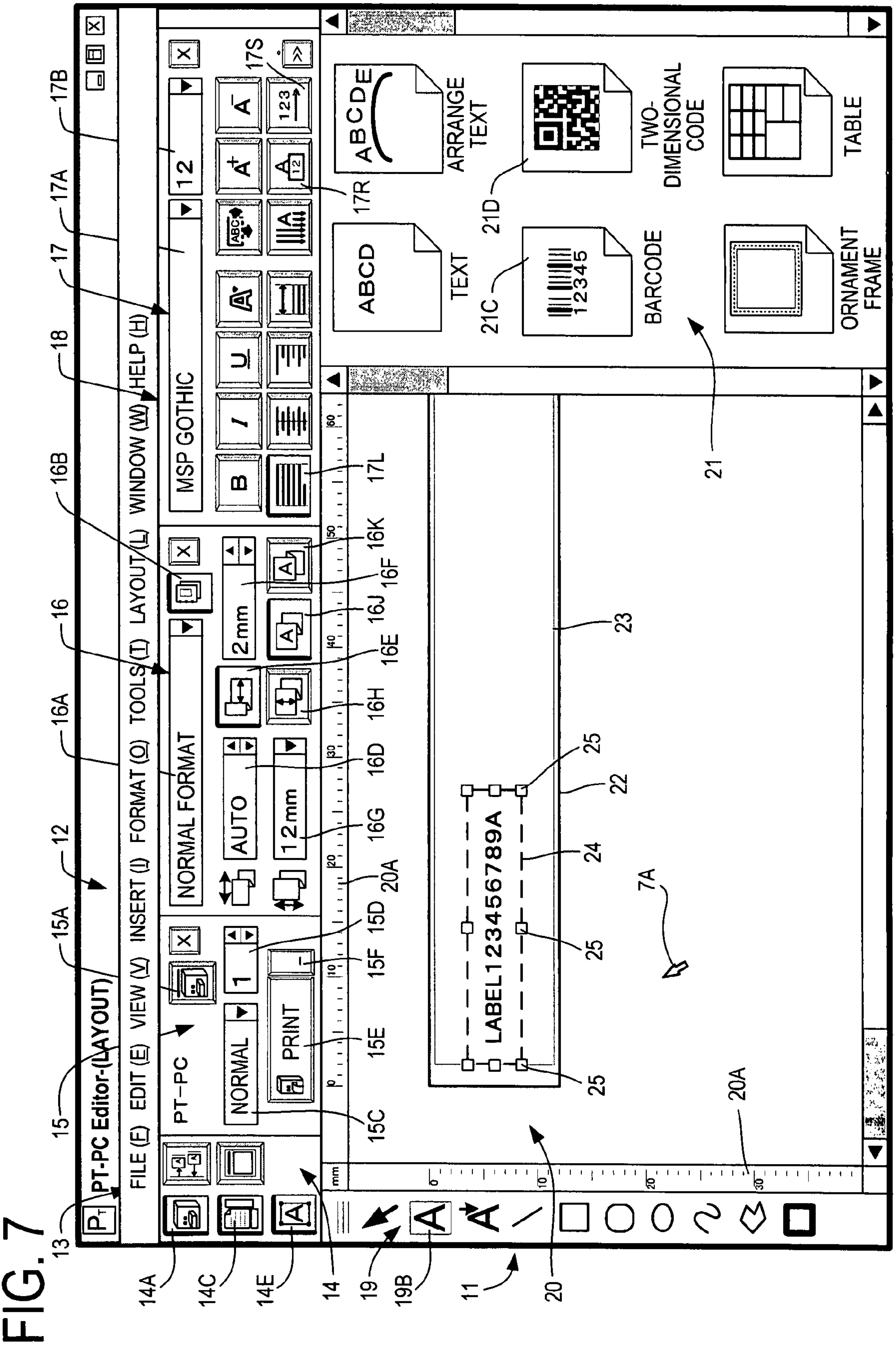
FIG. 7 is a sample image of an edit display screen in accordance with one or more aspects of the disclosure.

An edit display screen 11 displayed on a screen 5 of the display device 4 in the computer device 2 will be described with reference to FIG. 7. FIG. 7 shows a sample image of the edit display screen. The edit display screen 11 shown in FIG. 7 may be stored in the hard disk mounted on the HDD 49 and may be mainly displayed when the print data make/edit process program is executed.

As shown in FIG. 7, a title bar 12 is displayed on top portion of an edit display screen 11. A menu bar 13 is displayed under the title bar 12. Under the menu bar 13, a property display/hide bar 14, a print property 15, a page property 16, and a text property 17 is displayed on a property dock 18, in order from the left. The property display/hide bar 14 will be used when the user displays or hides each property. The print property 15 will be used when the user configures configurations related to printing and prints. The page property 16 will be used when the user sets size of paper and direction of paper. The text property 17 will be used when the user sets font, size, and position or the like of the input text. Under above elements, a draw tool bar 19, a work area 20, and an object dock 21 are displayed, in order from the left. The draw tool bar 19 has functions of selection of object, input of text, drawing of figures, and the like. The work area 20 may be used when the user to make the label. The object dock 21 may be used when the user inserts text, arranged text, barcode, two-dimensional code, ornament frame, table of the like. A mouse cursor 7A is displayed on the edit display screen 11. The mouse cursor 7A may move around on the edit display screen 11, and drag-and-drop may be conducted by the mouse cursor 7A.

A title of "PT-PC Editor—[Layout]" is displayed on the title bar 12. A minimize button, a maximize button, a close button are arranged on right edge of the title bar 12. If the close button is clicked, the edit display screen 11 will be closed.

A file (F) menu, an edit (E) menu, a view (V) menu, an insert (I) menu, a format (O) menu, a tools (T) menu, a layout (L) menu, a window (W) menu, and a help (H) menu are arranged on the menu bar 13, in order from the left.

On the upper portion of property display/hide bar 14, a print property display/hide button 14A and a layout property display/hide button are displayed, in order from the left. The print property display/hide button 14A will be used when the user switches display/hide of the print property 15. The layout property display/hide button will be used when the user switches display/hide of the layout property. On the middle portion of the property display/hide bar 14, a page property display/hide button 14C and a data base property display/hide button are displayed, in order from the left. The page property display/hide button 14C will be used when the user switches display/hide of the page property 16. The data base property display/hide button will be used when the user switches display/hide of the data base property. On the lower portion of the property display/hide bar 14, a text property display/hide button 14E is displayed. The text property display/hide button 14E will be used when the user switches display/hide of the text property 17. In the example of FIG. 7, three buttons of the print property display/hide button 14A, the page property display/hide button 14C, and the text property display/hide button 14E on the property display/hide bar 14 are pressed, and three properties of the print property 15, the page property 16, and the text property are displayed on the edit display screen 11.

On the upper portion of the print property 15, the printer name which is set ("PT-PC" is set in the embodiment), the printer setting button 15A, a print property hide button are displayed, in order from the left. The printer setting button 15A is used when the user sets the printer to be used. The printing property hide button is used when the user hides the printing property 15. On the middle portion of the print property, an output property combo box 15C, a number of copies spinbox 15D are displayed, in order from the left. The output property combo box 15C is used when the user sets the output property ("MONOCHROME" is set in the embodiment). The number of copies spinbox 15D will be used when the user sets the number of copies ("1" is set in the embodiment). On the lower portion of the print property, a print button 15E and print advanced setting button 15F are displayed, in order from the left. Here, if the printing button is pressed, the label will be printed based on the content of the print frame edited in the label making work area 20 and shape in accordance with above configuration.

On the upper portion of the page property 16, a label format combo box 16A, a background theme display/hide button 16B, and a page property hide button are displayed, in order from the left. The label format combo box 16A will be used when the user sets the format of the label, and the text of "NORMAL FORMAT" is displayed in the embodiment. The background theme display/hide button 16B will be used when the user switches display/hide of the background theme of the format which is set on the label format combo box 16A. Here, in this embodiment, the button is clicked and "display" is set. The page property hide button will be used when the user hides the page property 16. On the middle portion of the page property 16, a tape length spinbox 16D, a tape length auto-adjustment button 16E, and a right and left margin spinbox 16F are displayed, in order from the left. The tape length spinbox 16D will be used when the user sets the tape length. Here, in this embodiment, "AUTO" is set. The tape length auto-adjustment button 16E will be used when the user sets whether tape length is auto-adjusted based on the object which is inserted. Here, in this embodiment, the button is clicked and "AUTO-ADJUSTMENT" is set. The right and left margin spinbox 16F is used when the user sets the right and left margin on the printing medium. Here, in this embodiment, "2 mm" is set. On the lower portion of the page property 16, a tape width combo box 16G, a paper detection button 16H, a landscape button 16J, a portrait button 16K are displayed, in order from the left. The tape width combo box 16G will be used when the user sets the printing medium. Here, in this embodiment, the long tape with 12 mm is set. The paper detection button 16H will be used to detect a paper. Here, in this embodiment, the button is not click. The landscape button 16J will be used when the user sets that the direction of the printing medium is the landscape. Here, in this embodiment, the button is clicked, and "landscape" is set. The portrait button 16K will be used when the user sets that the direction of the printing medium is the portrait. Here, in this embodiment, the button is not clicked. Either the landscape button 16 J or the portrait button 16K may be selected. If the print frame 22 corresponding to the precut label is selected, for instance, the text of "12 mm Dia" or "17 mm×54 mm" will be displayed. That is, the width of long roll tape is not only displayed. Here, in the condition which is set, interfaces the print frame 22 of the label making work area 20 which will be described later.

On the upper portion of the text property 17, a font selection combo box 17A, a font size combo box 17B, and a text property hide button may be displayed, in order from the left. The font selection combo box 17A will be used when the user selects the font. Here, in this embodiment, "MSP GOTHIC" is set. The font size comb box 17B will be used when the user sets the font size. Here, in this embodiment, "11" is set. The text property hide button will be used when the user hides the text property 17. On the middle portion of the text property 17, a bold button, an italic button, an underlined button, a text ornament button, a text control method button, an enlarged button, a reduced button are displayed, in order from the left. The bold button will be used when the user makes the text bold. The italic button will be used when the user makes the text italic. The underlined button will used when the user makes the text underlined. The text ornament button will be used when the user ornaments the text. The text control method button will be used when the user the sets the control method of the text. The enlarged button is used when the user makes the text enlarged. The reduced button will be used when the user makes the text reduced. On the lower portion of the text property 17, a justification button, a right-justification button, a centering button, an equal space button, a vertical writing button, a horizontal-vertical writing button 17R, a numbering button 17S, enlarged/reduced button may be displayed, in order from the left. The justification button 17L will be used when the user inputs and edits the text with justification. The right-justification button will be used when the user inputs and edits the text with right-justification. The centering button will be used when the user inputs and edits the text with centering. The vertical writing button will be used when the user inputs the text with vertical. The horizontal-vertical writing button 17R will be used when the user inputs the text with horizontal in vertical writing. The numbering button 17S will be used for numbering. The enlarged/reduced button will be used when the user enlarges/reduces the text property 16. Here, in this embodiment, the justification button 17L is selected, and two buttons of the horizontal-vertical writing button 17R and the numbering button 17S are not selectable. Here, in the condition which is set, interfaces the print frame 22 of the label making work area 20 which will be described later.

On the draw tool bar 19, a selection button, a text button 19B, a vertical writing text button, a line button, a rectangle button, a rounded corner rectangle button, an ellipse button, a free curve button, a polygon button, an ornament frame button may be displayed. The selection button will be used when the user designs an object to be selected. The text button 19B will be used when the user designs area/position and inputs text. The vertical writing text button will be used when the user designs area/position and vertically input text. The line button is used when the user draws the line. The rectangle button will be used when the user draws the rectangle. The rounded corner rectangle button will be used when the user draws the rounded corner rectangle. The ellipse button will be used when the user draw the ellipse. The free curve button will be used when the user draws free curve. The polygon button will be used the user draws polygon. The ornament frame button will be used when the user draws the ornament frame. Here, in this embodiment, the text button 19B is selected.

Rulers 20A are displayed upper side and left side of the label making work area 20. The rulers 20 may be measure of length and width of the label. A print frame 22 which is a horizontally long rectangular is displayed on the label making work area 20. Inside of the print frame 22, a print limitation frame 23 reflecting white spaces of right and left is displayed. The print frame 22 and the print limitation frame 23 are particular images, so these frames will be not displayed, in contrast to normal illustrations (hereinafter, the image not to be displayed will be called "back ground theme"). Here, display/hide of the back ground theme may be switched by predetermined operation. The normal illustrations are framed in by the illustration box (not shown), the user can distinguish whether the back ground theme or not. Also, the print frame 22 indicates the size of the label, and corresponds any of printing medium.

In the print frame which is a horizontally long rectangular, the text box 24 is displayed with dotted line. The text of "LABEL123456789" is displayed in the text box 24. Handles 25 are displayed on the four corners and middle point of each side of text box with small squares. If the handle 24 is dragged and dropped, the text box 24 will be enlarged and reduced within the print frame 22. If the handle 25 is displayed, the print frame 22 having the handle 25 will is selectable.

On the upper portion of the object dock 21, caret on the layout, a text button, an arrange text button are displayed, in order from the left. If the text button is pressed, a text-entry mode will be entered. If the arrange button is pressed, an arrange text screen will be displayed. On the middle portion of the object dock 21, a barcode button 21C, a two-dimensional code button 21D are displayed, in order from the left. If the barcode button is pressed, a barcode screen will be displayed. If the two-dimensional code button is pressed, a two-dimensional code screen will be displayed. On the lower portion of the object dock 21, a decoration frame button and a table button are displayed, in order from the left. If the decoration frame button is pressed, a property screen of the decoration frame will be displayed. If the table button is pressed, a property screen of the table will be displayed.

Here, if the barcode button 21C is double-clicked, the barcode property screen will be displayed, and configuration is selected and then selected configuration is set. In the predetermined condition, desired text may be highlighted among text input in the text box 24 displayed on the print frame 22 of the label making work area 20, and then barcode button 21C is clicked, highlighted text will be coded in the barcode will be displayed in the print frame 22 of the label making work area 20 with not highlighted text by the mouse cursor 7A. If new text is input into the property screen of the barcode, and then the "OK" button of the property screen is clicked, input text may coded in the barcode and the barcode may be displayed in the print frame 22 of the label making work area 20 based on the configuration which is set in the property screen of the barcode.

If the two-dimensional code button 21D is double-clicked, a property screen of the two-dimensional code (not shown) will be displayed, and the size and the error-correction status of the two-dimensional code and the like will be set. In the predetermined condition, if the user highlights the text which is input in the text box 24 displayed on the print frame 22 of the label making work area 20, and then clicks the two-dimensional code button 21D, the highlighted text will be coded in the two-dimensional code and the two-dimensional code will be displayed on the print frame 22 of the label making work area 20 with not selected text by the mouse cursor 7A. Also, if new text is input in the property screen of the two-dimensional code, and then the "OK" button of the property button of the two-dimensional code is clicked, the new text will coded in the two-dimensional code and the two-dimensional code may be displayed on the print frame 22 of the label making work area 20.

The label which is made by the tape printer 101 will be described with reference to FIG. 8 to FIG. 11. FIG. 8 to 11 are views showing frame formats of the two-dimensional labels.

Figure 8:
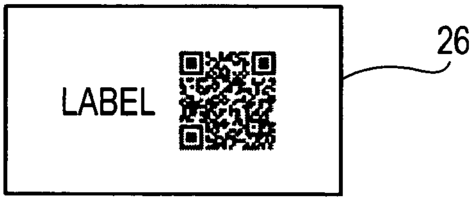
FIG. 8 is a view of a frame format of a two-dimensional code label in accordance with one or more aspects of the disclosure.
Figure 14:
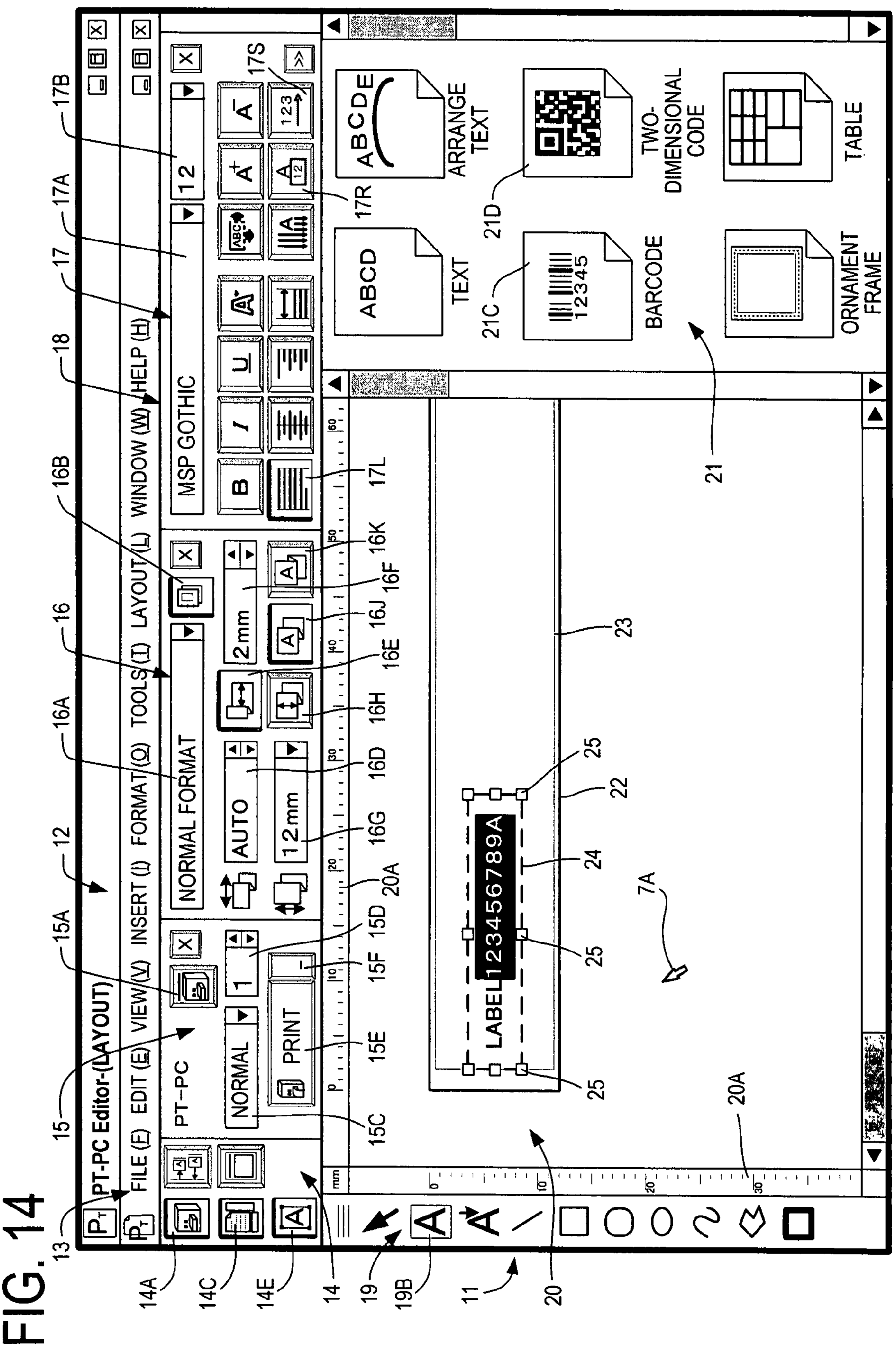
FIG. 14 is a sample image of the edit display screen in the case where the two-dimensional code is edited with the use of a print frame.
Figure 15:
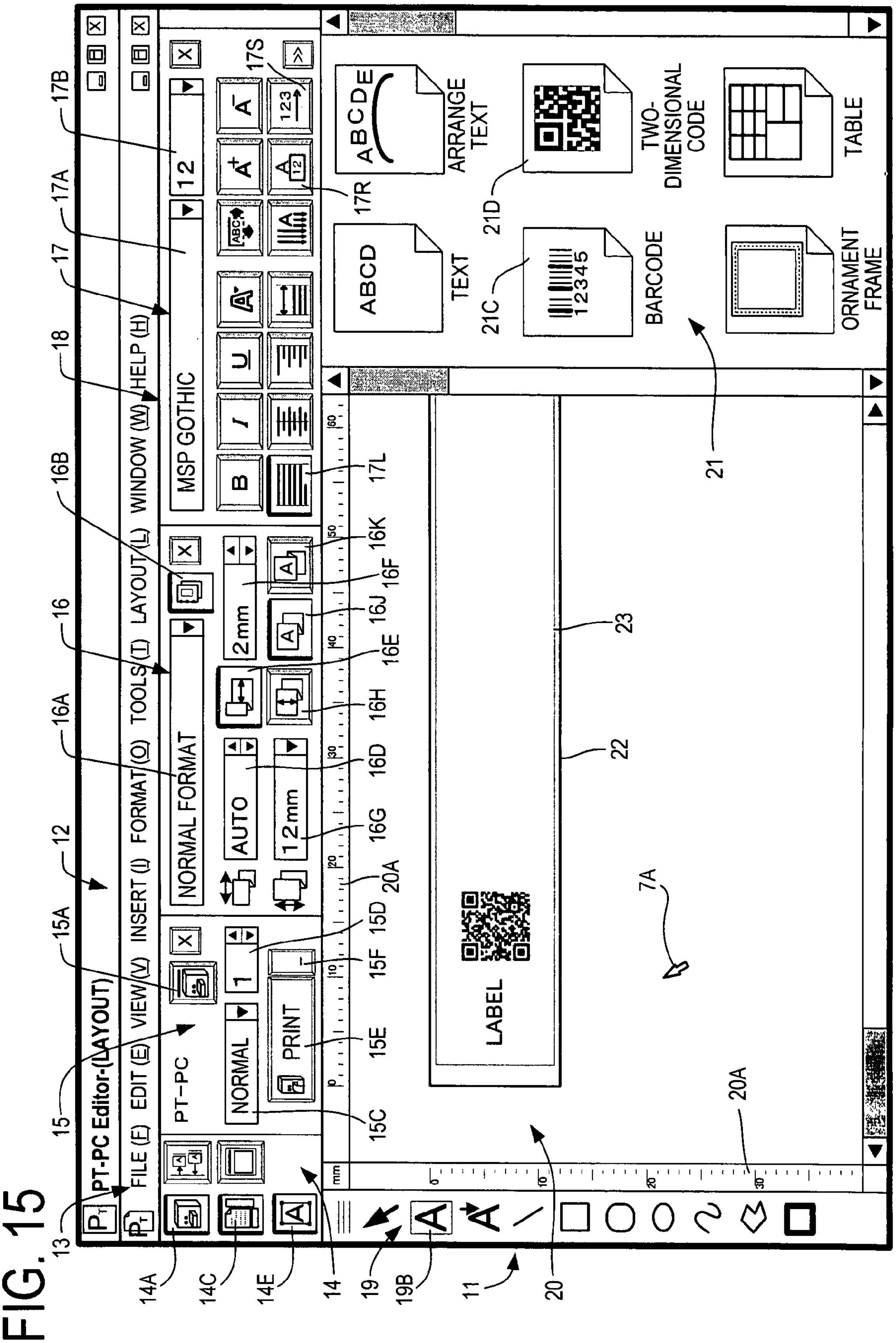
FIG. 15 is a sample image of the edit display screen in the case where the two-dimensional code is edited with the use of a print frame.

FIG. 8 shows an example of two-dimensional code label 26. If the user highlights desired text among input text of "LABEL123456789" and then clicks the two-dimensional code button 21D and clicks the print button 15E on the edit display screen 11 shown in FIG. 7, the two-dimensional code label 26 will be made (see FIGS. 14 and 15). As shown in FIG. 8, text of "LABEL" and one two-dimensional code coded from the text "123456789" in predetermined size are printed on the two-dimensional label 26. Here, a size of the two-dimensional code label 26 may be 12 millimeters and 22 millimeters.

Figure 9:
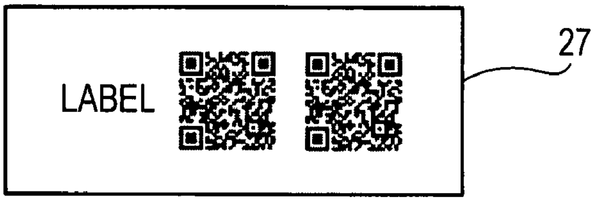
FIG. 9 is the view of a frame format of a two-dimensional code label in accordance with one or more aspects of the disclosure.
Figure 16:
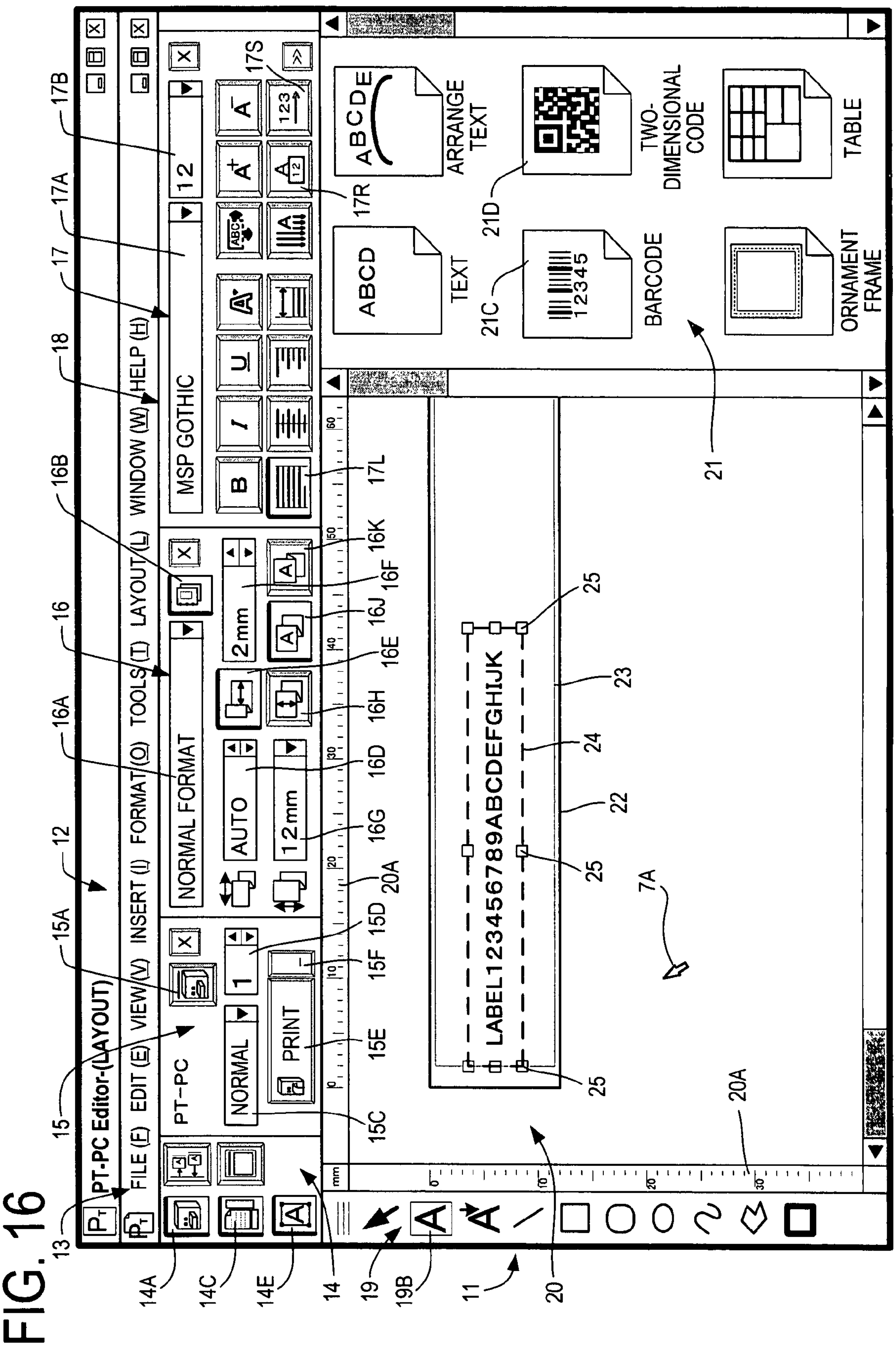
FIG. 16 is a sample image of the edit display screen in the case where the two-dimensional code is edited with the use of a print frame.
Figure 17:
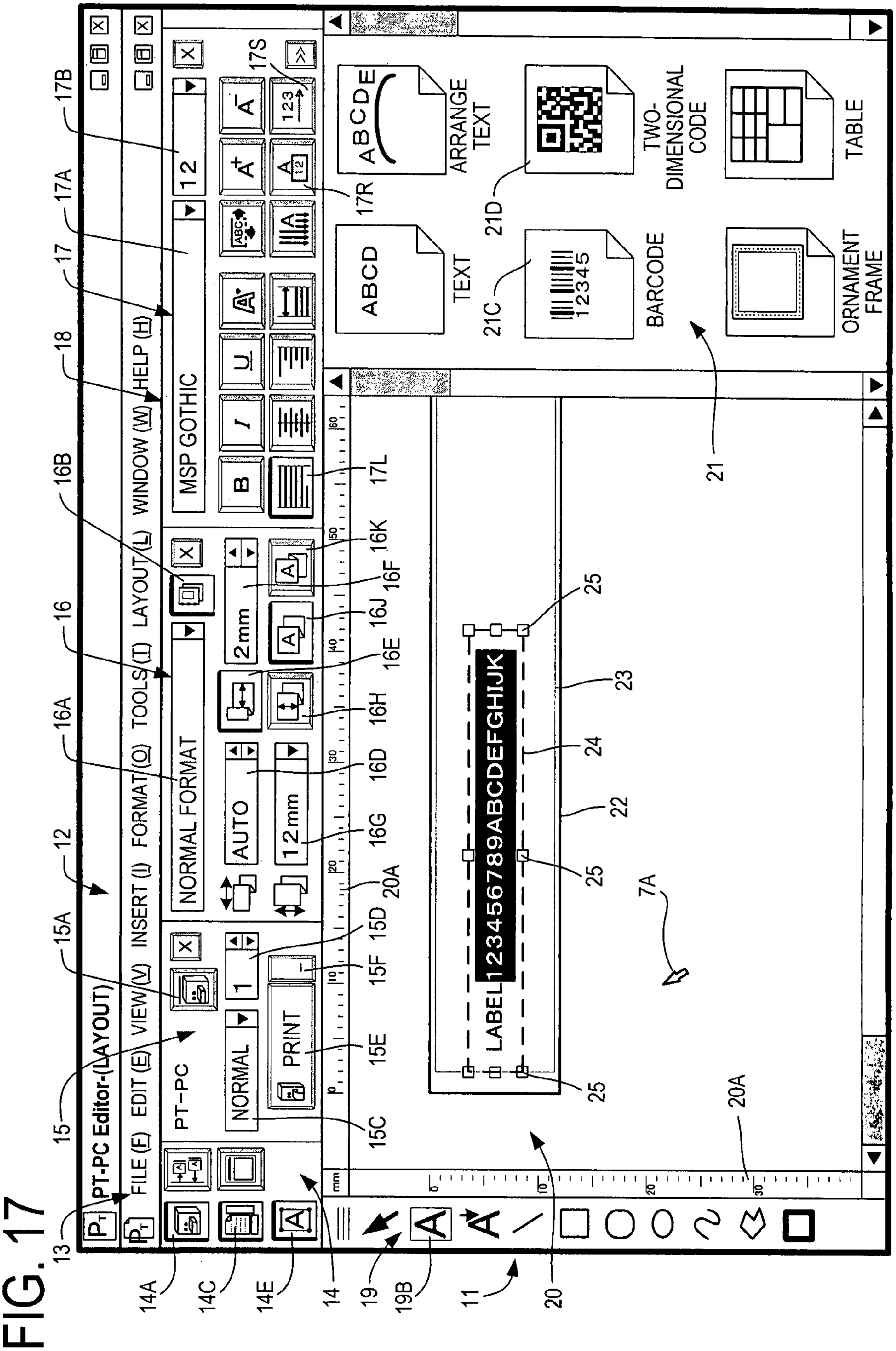
FIG. 17 is a sample image of the edit display screen in the case where the two-dimensional code is edited with the use of a print frame.
Figure 18:
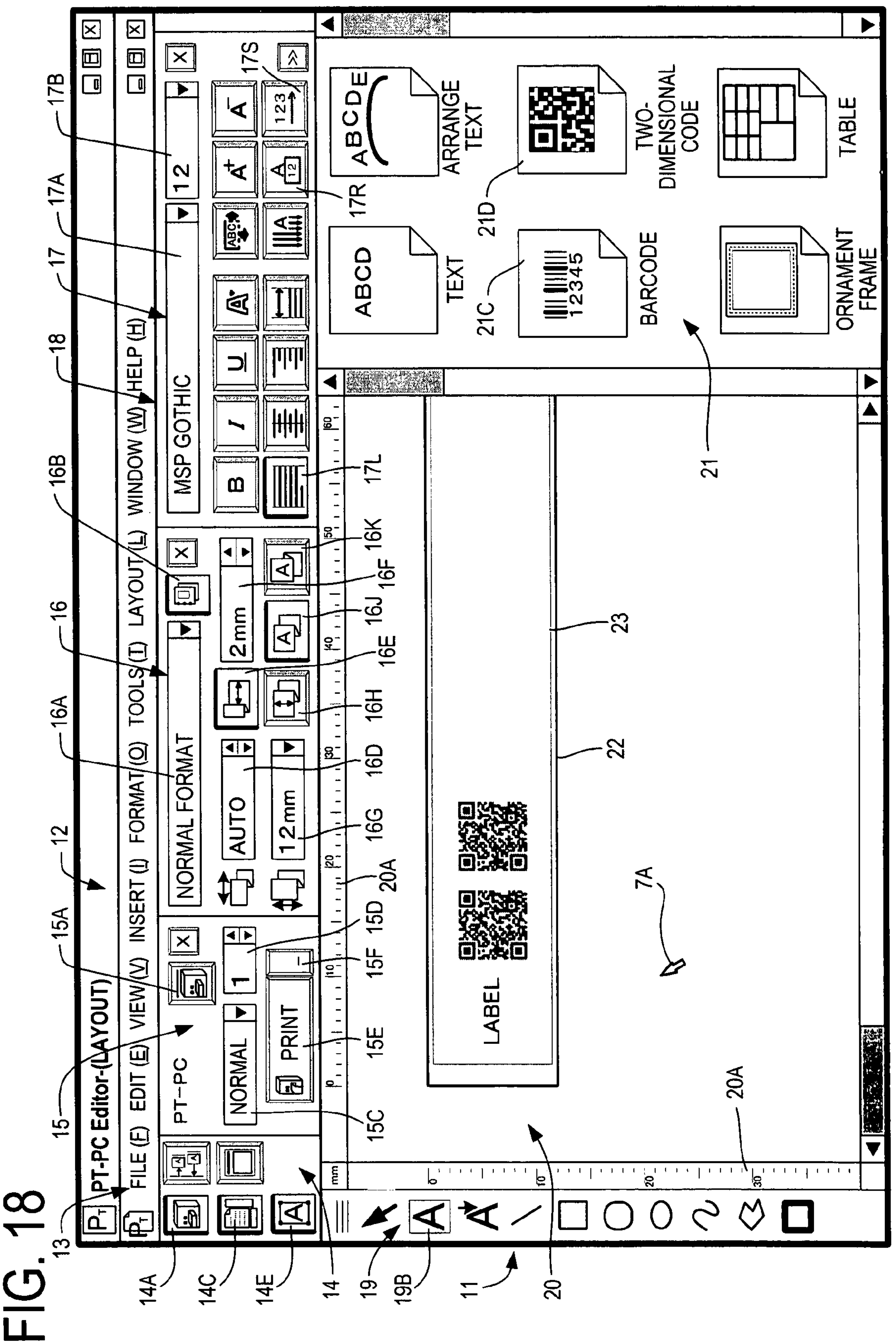
FIG. 18 is a sample image of the edit display screen in the case where the two-dimensional code is edited with the use of a print frame.

FIG. 9 shows an example of two-dimensional code label 26. If the user highlights desired text among input text of "LABEL123456789abcdefghijk" and then clicks the two-dimensional code button 21D and clicks the print button 15E on the edit display screen 11 shown in FIG. 7, the two-dimensional code label 26 will be made (see FIG. 16 to 18). As shown in FIG. 9, text of "LABEL" and two two-dimensional codes separately coded from the text "123456789abcdedfghijk" in predetermined size are printed on the two-dimensional label 27. Here, a size of the two-dimensional code label 27 may be 12 millimeters in height by 30 millimeters in width.

Figure 10:
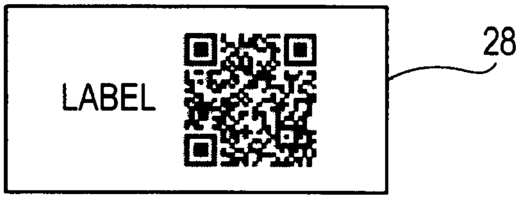
FIG. 10 is the view of a frame format of a two-dimensional code label in accordance with one or more aspects of the disclosure.
Figure 19:
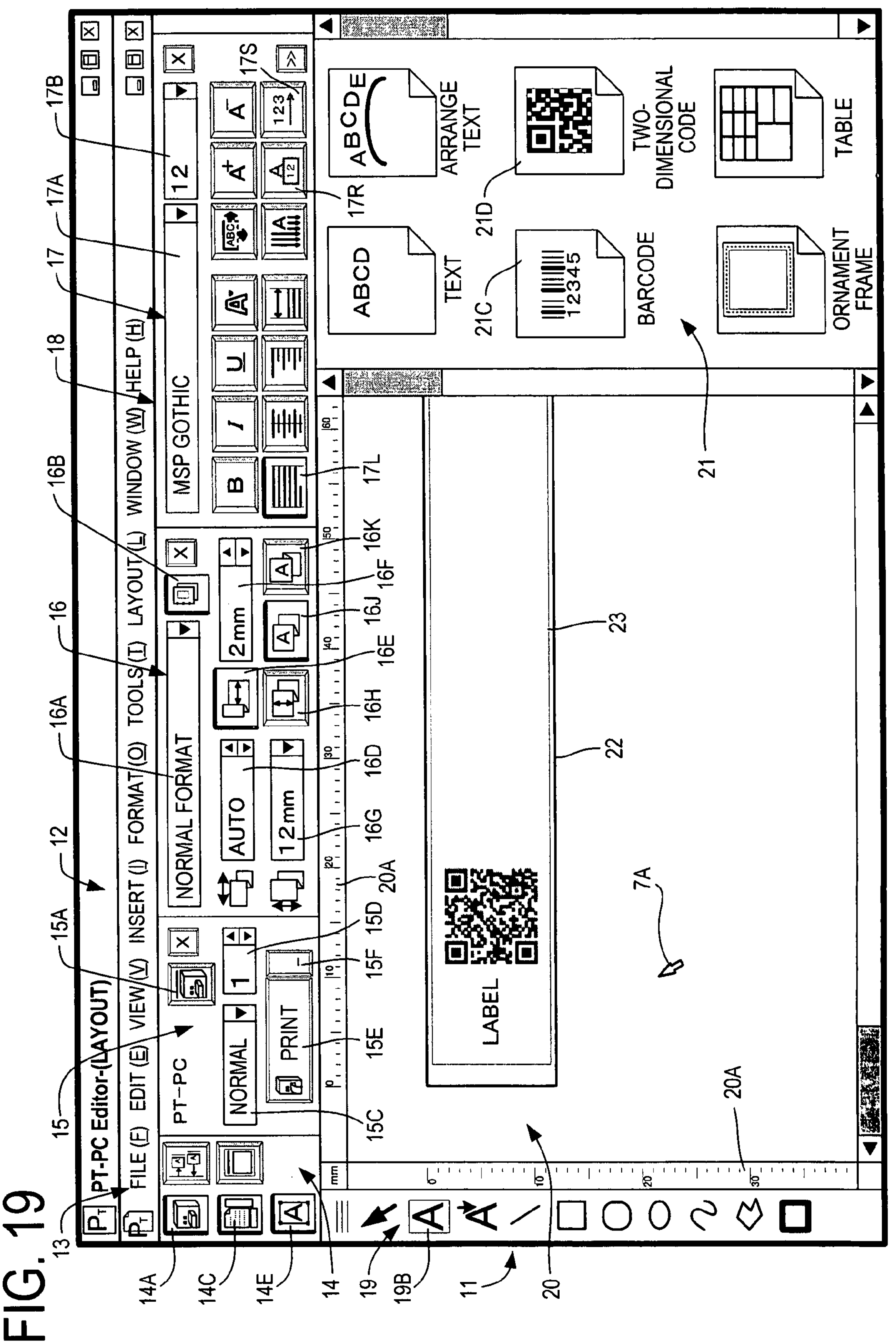
FIG. 19 is a sample image of the edit display screen in the case where the two-dimensional code is edited with the use of a print frame.

FIG. 10 shows an example of two-dimensional code label 28. If the user highlights desired text among input text of "LABEL123456789abcdefghijk" and then clicks the two-dimensional code button 21D and clicks the print button 15E on the edit display screen 11 shown in FIG. 7, the two-dimensional code label 26 will be made (see FIGS. 16, 17, and 19). As shown in FIG. 10, text of "LABEL" and two two-dimensional codes separately coded from the text "123456789abcdedfghijk" in predetermined size are printed on the two-dimensional label 28. Here, the size of the two-dimensional code label 28 may be 12 millimeters in height by 30 millimeters in width.

Figure 11:
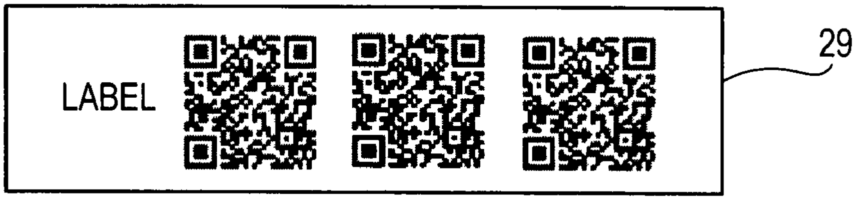
FIG. 11 is the view of a frame format of a two-dimensional code label in accordance with one or more aspects of the disclosure.
Figure 20:
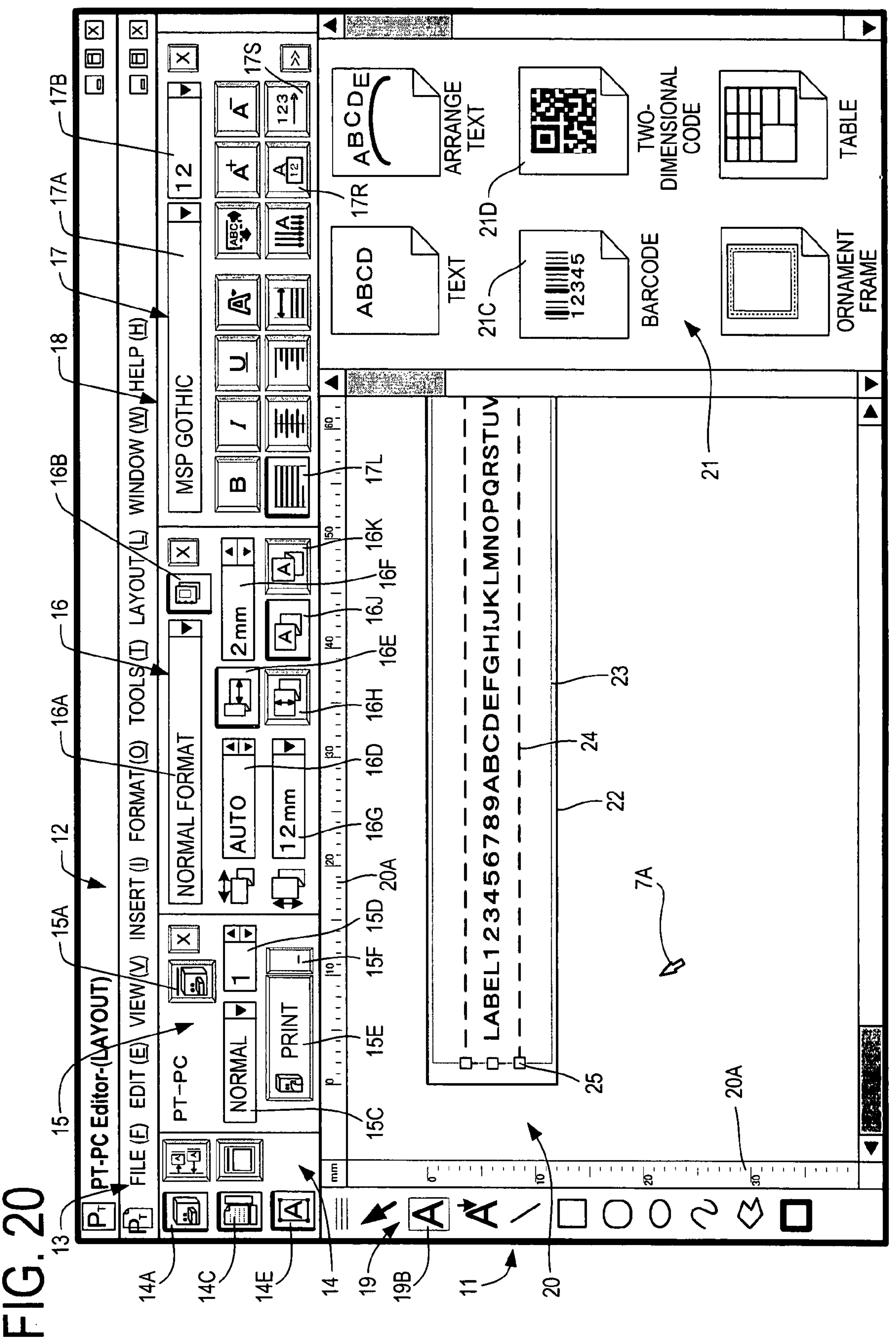
FIG. 20 is a sample image of the edit display screen in the case where the two-dimensional code is edited with the use of a print frame.
Figure 21:
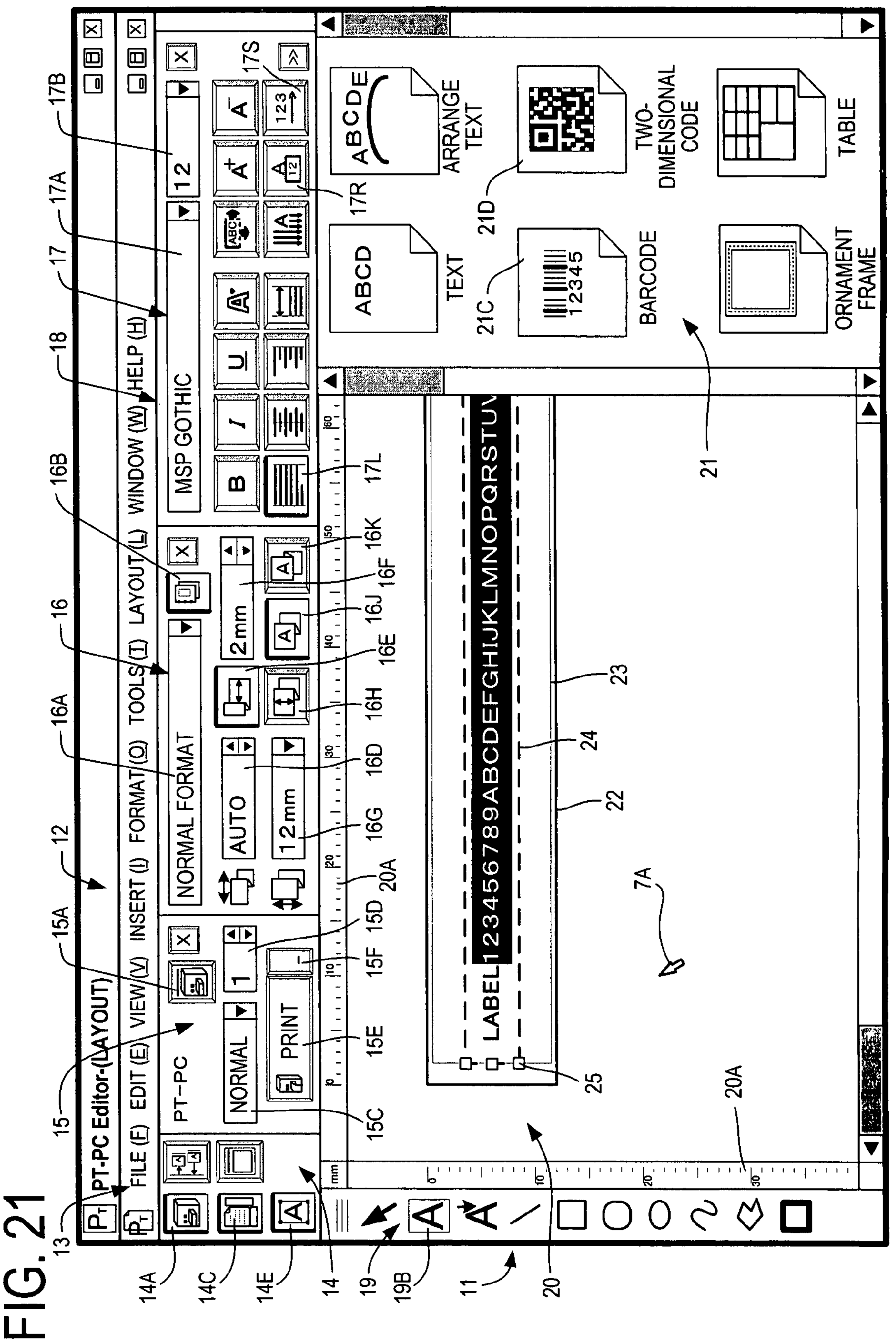
FIG. 21 is a sample image of the edit display screen in the case where the two-dimensional code is edited with the use of a print frame.
Figure 22:
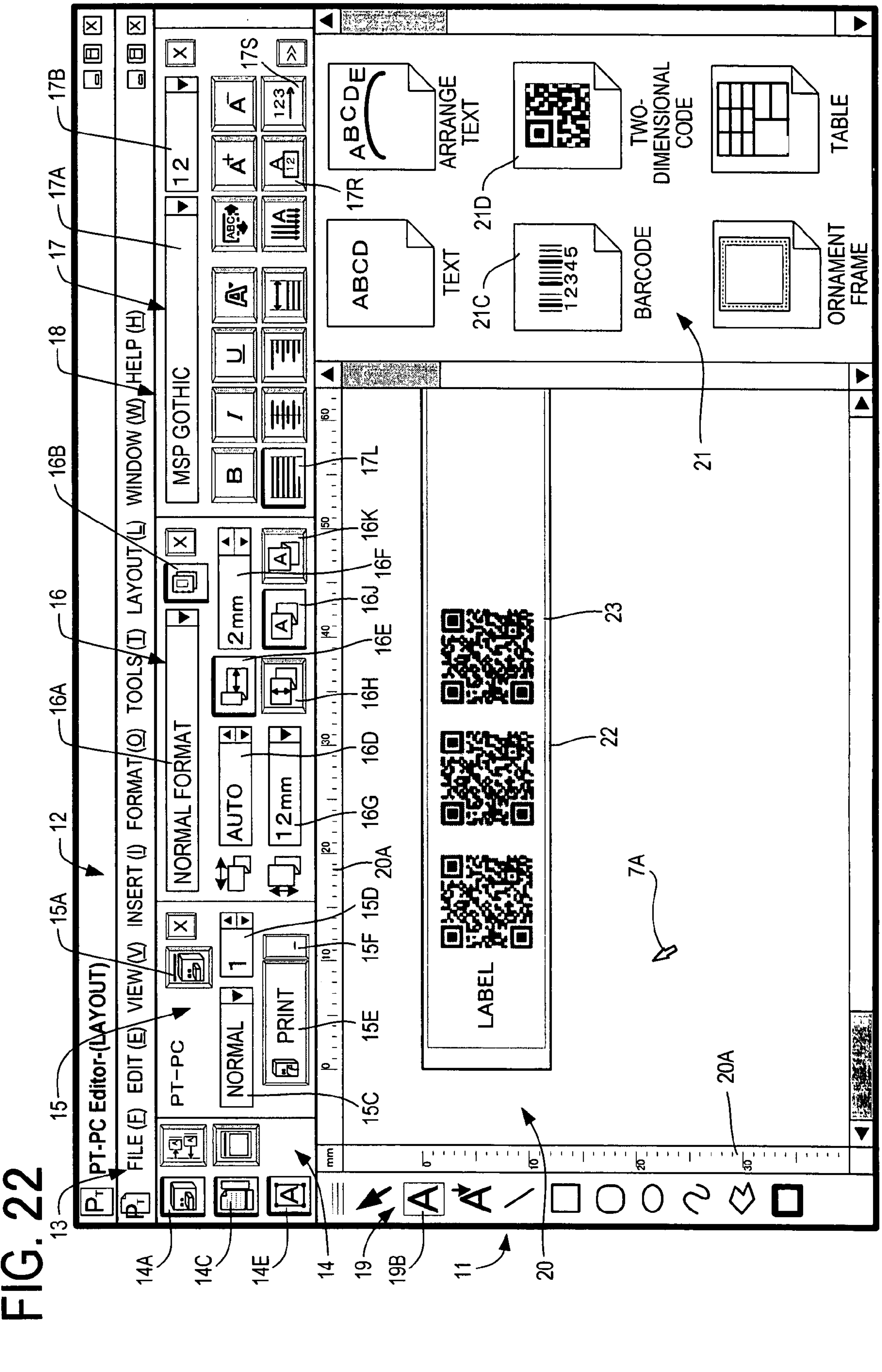
FIG. 22 is a sample image of the edit display screen in the case where the two-dimensional code is edited with the use of a print frame.

FIG. 11 shows an example of two-dimensional code label 29. If the user highlights desired text among input text of "LABEL123456789abcdefghijklmnopqrstuv" and then clicks the two-dimensional code button 21D and clicks the print button 15E on the edit display screen 11 shown in FIG. 7, the two-dimensional code label 26 will be made (see FIGS. 20, 21, and 22). As shown in FIG. 11, text of "LABEL" and two two-dimensional codes separately coded from the text "123456789abcdedfghijklmnopqrstuv . . . " in predetermined size are printed on the two-dimensional label 29. Here, the size of the two-dimensional code label 29 may be 12 millimeters in height by 47 millimeters in width.

Figure 12:
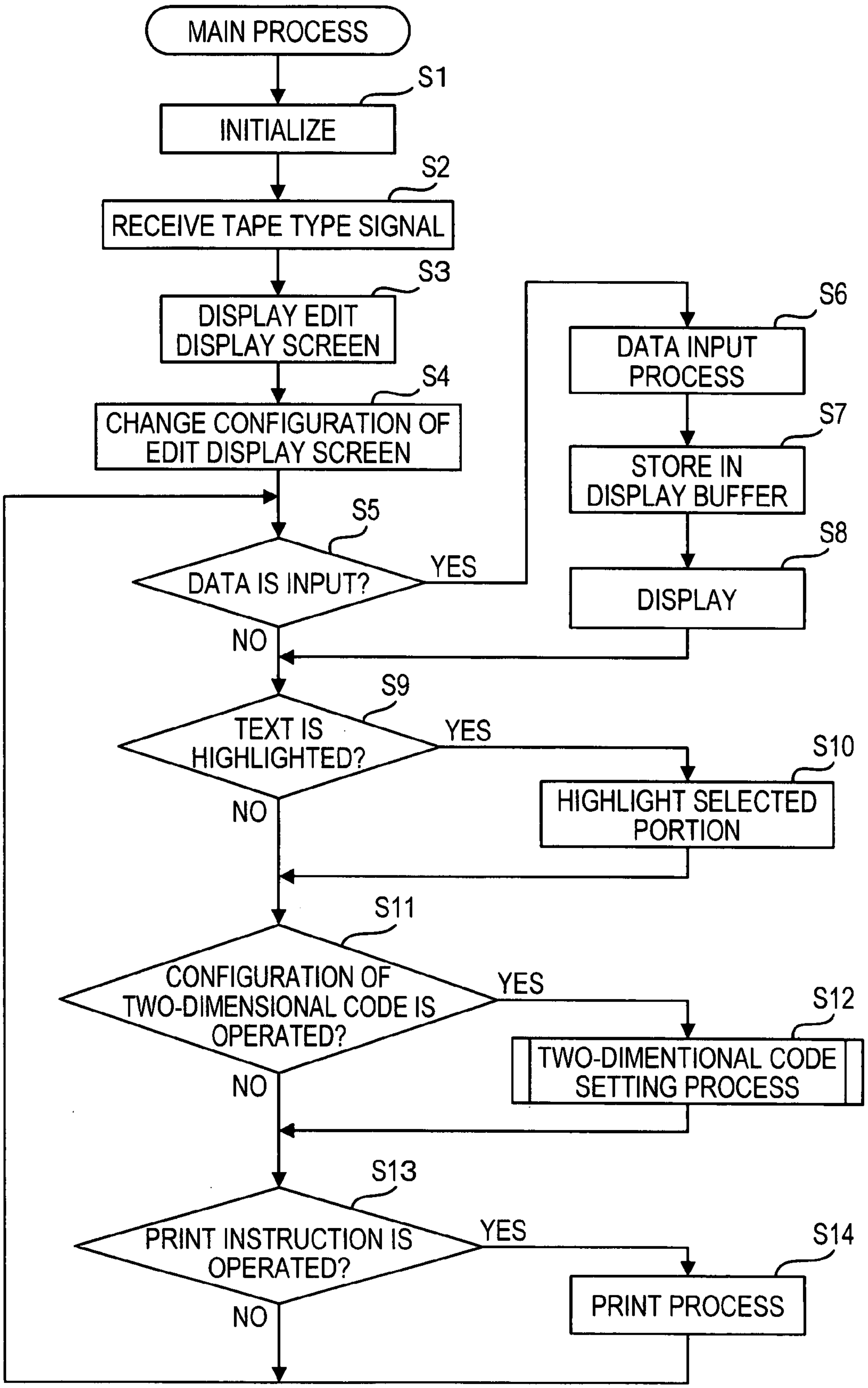
FIG. 12 is a flowchart of a main process in accordance with one or more aspects of the disclosure.
Figure 13:
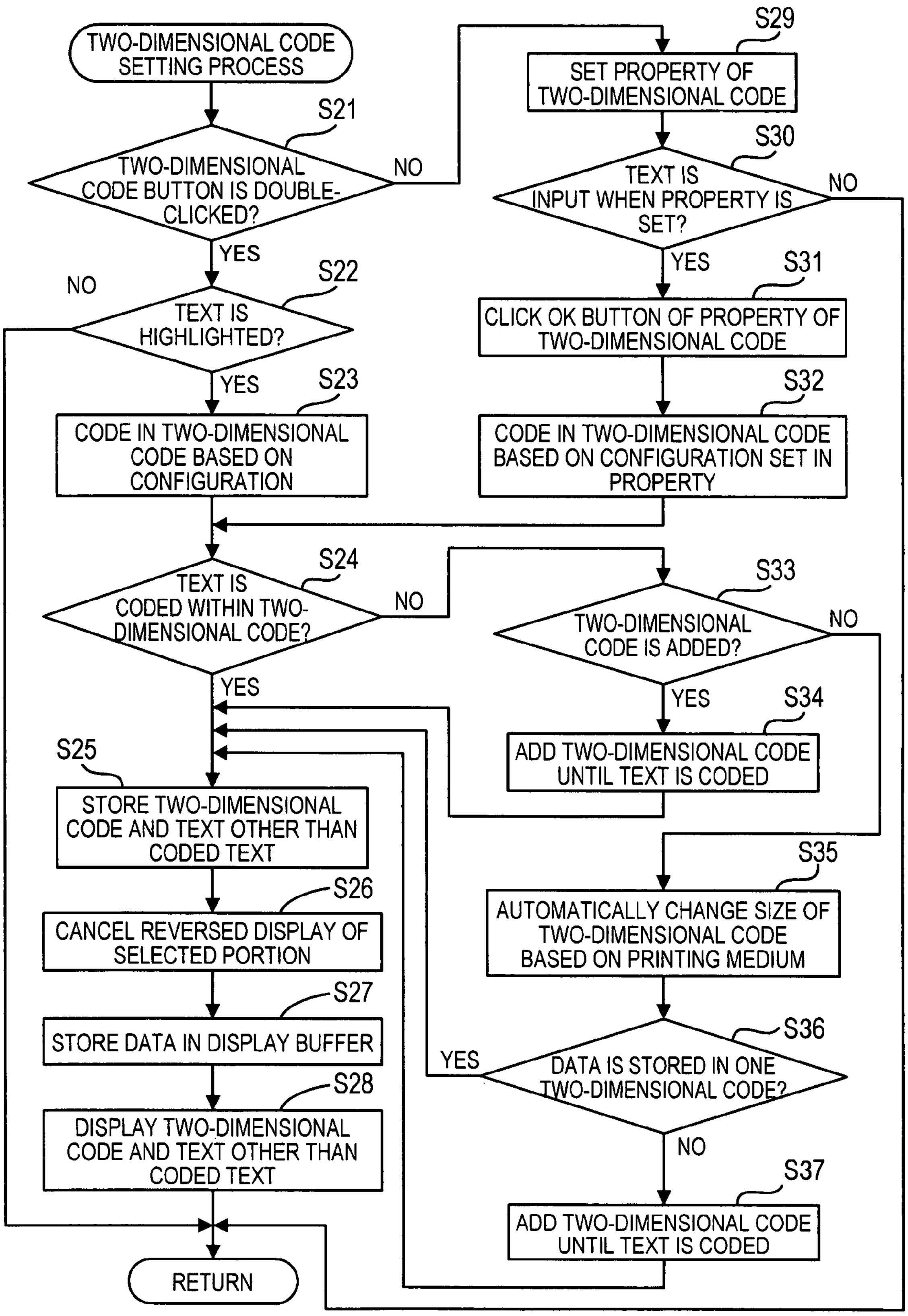
FIG. 13 is a flowchart of a two-dimensional code setting process in accordance with one or more aspects of the disclosure.

A flowchart of the computer device 2 making up the two-dimensional code printing apparatus 1 will be described with reference to FIGS. 12 and 13. FIG. 12 is a flowchart of a main process. FIG. 13 is a flowchart of a two-dimensional code setting process. Here, following processes may be executed in the CPU 41.

FIG. 12 shows a process which is executed when a two-dimensional code make/edit process program (stored in a hard disk mounted in the HDD 49) is executed.

As shown in FIG. 12, in S1, an initial process is executed. In the initial process setting process, RAM 43 may be initialized. Here, set information corresponding to the edit display screen 11 at the end of the main process (not shown) may be stored in the hard disk mounted on the HDD 49, and the stored information may be used as the basis information for start-up of the editor display screen 11. After that, the procedure will be shifted to S2.

In S2, the CPU 41 gets a type of the roll printing medium 103A mounted on the tape printer 101 from the computer device 2 and connected tape printer 101. The CPU 41 sends medium type demand command to the tape printer 101 via the cable K. The medium type demand command instructs a connected device to send the type of mounted roll printing media 103. In response to the command, the tape printer 101 sends the type of the printing medium back to the computer device 2, and the type information is received by the computer device 2 via the cable K. The information of the type will be stored in the mounted tape type storage area 43E. After that, the procedure will be shifted to S3.

In S3, the edit display screen 11 shown in FIG. 7 is displayed on the screen 5 of the display device 4 of the computer device 2 via the display buffer 43A of the RAM 43 and the display device controller 50. In this time, the type of roll printing medium 103A currently mounted on the tape printer 101 will be displayed on the tape width combo box 16G of the page property 16 by referring to the tape type storage area 43 and the like, and the print frame 22 which indicates the size of the roll printing medium 103A will be displayed on the label making work area 20. Here, in FIG. 7 the text of "NORMAL FORMAT" is displayed on the label format combo box 16A, and the text of "AUTO" is displayed on the tape length spin box 16D. The display contents, which were displayed at the end point of previous start-up, are displayed on other than above items of the page property 16. Also, the display contents, which were displayed at the end point of previous start-up, are displayed on the property display/hide bar 14, the print property 15, the text property 17, draw tool bar 19, and the object dock 21.

In S4, to make desired label by the user, the configuration of the edit display screen 11 is changed. In the case where the user is able to easily make the two-dimensional code label, the user may have to operate the two-dimensional code button 21D of the object dock 21 and open the property screen of the object dock 21, and then set the size and the error-correction status of the two-dimensional code and the like beforehand.

In S5, to input text data or the like in the text box 24 of the print frame 22 (which is used when the user makes the label), it is determined that text data or the like is input from the keyboard 6 or from the internet and the like via the telephone line 53 or the modem 51. If it is determined that the data is not input (S5:NO), the procedure will be shifted to S9. On the other hand, if it is determined that the data is input (S5:YES), the procedure will be shifted to S6 and data input process will be executed and the data will be stored in the text memory 43F of the RAM 43. In the data input process, the input text data or the like will be processed to make the label. After that, the procedure will be shifted to S7. Here, text data can be input from various files stored in the hard disk mounted on the HDD 49 of the host controller 3.

In S7, display dotted image data is made from stored display dotted pattern data of various character and symbol based on the data stored in the text memory 43F of the RAM 43, and then made display dotted image data will be stored in the display buffer 43A of the RAM 43. And then, the procedure will be shifted to S8.

In S8, data stored in the display buffer 43A of the RAM 43 is displayed in the textbox 24 of the print frame 22 displayed on the label making work area of the edit display screen 11 via the display device controller 50. And then, the procedure will be shifted to S9.

In S9, it is determined whether or not desired text among the text displayed in the textbox 24 of the print frame 22 is highlighted. If it is determined that desired text is not highlighted (S9:NO), the procedure will be shifted to S11. On the other hand, it is determined that desired text is highlighted (S9:YES), the procedure will be shifted to S10. In S10, the data related to highlighted text among the text displayed in the textbox 24 of the print frame 22 will be stored in the work storage area 43G of the RAM 43 and the desired text is highlighted via the display buffer 43A and the display device controller 50. And then, the procedure will be shifted to S11.

In S11, it is determined whether or not there is an operation for the two-dimensional code corresponding to the highlighted text. If it is determined that there is no operation for the two-dimensional code (S11:NO), the procedure will be shifted to S13. On the other hand, if it is determined that there is an operation for the two-dimensional code (S11:YES), the procedure will be shifted to S12.

Here, the explanation of the main process with reference to FIG. 12 will be interrupted temporarily, and the two-dimensional code setting process called from S12 will be described with reference to FIG. 13.

As shown in FIG. 13, in S21, it is determined that the two-dimensional code button 21D displayed on the object dock 21 of the edit display screen 11 is one-clicked by the mouse 7 or the like. If it is determined that the button is one-clicked (S21:YES), the procedure will be shifted to S22.

In S22, it is determined whether or not desired text among the text displayed in the textbox 24 of the print frame 22 is highlighted. If it is determined that desired text is not highlighted (S22:NO), the procedure will be returned and shifted to S13 of FIG. 12. On the other hand, if it is determined that desired text is highlighted (S22:YES), the procedure will be shifted to S23 and the highlighted text will be coded based on the configuration including the size and error-correction status of the two-dimensional code which is set in S4. Here, if the configuration of the two-dimensional code including the size and the error-correction status of the two-dimensional code were not set in S4, the desired text will be coded based on the previous configuration. And then, the procedure will be shifted to S24.

Returning S21, if it is determined that the button is not one-clicked (S21:NO), it will be determined that the two-dimensional code button 21D is double-clicked. In this case, the property screen of the two-dimensional code (not shown) will be displayed and the procedure will be shifted to S29 to execute the property process.

In S29, the size and the error-correction status of the two-dimensional code or the like is set. Here, set above configuration including the size and error-correction status of the two-dimensional code will be the configuration for the two-dimensional code to be made hereafter. And then, the procedure will be shifted to S30.

In S30, it is determined whether or not the text is input in the text input column of the property screen of the two-dimensional code (not shown). If it is determined that the text is not input in the input column (S30:NO), the procedure will be shifted to S13 of FIG. 12. On the other hand, if it is determined that the text is input in the input column (S30:YES), the procedure will be shifted to S31, and then the user may click "OK" button displayed on the property screen of the two-dimensional code. And then, the procedure will be shifted to S32.

In 32, the text, which is input in the input column on the property screen of the two-dimensional code (not shown), is coded in the two-dimensional code based on the configuration including the size and error-correction status of the two-dimensional code set in S29. And then, the procedure will be shifted to S24.

In S24, it is determined whether the text is coded within the two-dimensional code based on the configuration including the size and error-correction status of the two-dimensional code or the like, which is set previously. If it is determined that the text will be coded within the two-dimensional code (S24:YES), the procedure will be shifted to S25. On the other hand, if it is determined that the text will be not coded within the two-dimensional code (S24:NO), the procedure will be shifted to S33.

In S33, it is determined whether or not the two-dimensional code will be added so that the data to be coded in the two-dimensional code is coded within the roll printing medium 103A displayed on the tape width combo box 16G. If it is determined that the two-dimensional code will not be added (S33:NO), the procedure will be shifted to 35. If it is determined that the two-dimensional code will be added (S33:YES), the procedure will be shifted to S34, and the two-dimensional code will be added based on the configuration including the size and error-correction status of the two-dimensional code which is set beforehand until desired text is coded. And then, the procedure will be shifted to S36.

In S35, the size of the two-dimensional code is automatically changed based on the width of the roll printing medium 103A corresponding to the combo box 16G. Here, automatically set configuration will be the configuration for the two-dimensional code to be made hereafter. And then, the procedure will be shifted to S36.

In S36, text data to be coded will be coded within one two-dimensional code with the configuration of the two-dimensional code which is set in S35. If it is determined that text data to be coded can be coded within one two-dimensional code (S36:YES), the procedure will be shifted to S25. On the other hand, if it is determined that text data to be coded can not be coded within one two-dimensional code (S36:NO), the procedure will be shifted to S37, and the two-dimensional code will be added until desired text data can be coded based on the configuration which is set beforehand. After that, the procedure will be shifted to S25.

In S25, the data corresponding to coded two-dimensional code will be stored in the edit data storage area 43B with the non-coded text. And then, the procedure will be shifted to S26.

In S26, the highlighted text stored in the work storage area 43G of the RAM 43 will be cleared and deactivated to highlight the text via the display device controller 50. And then, the procedure will be shifted to S27.

In S27, display dotted image data composed of display dotted pattern data of the two-dimensional code data and text data which is other than the two-dimensional code will be stored in the display buffer 43A of the RAM 43. And then, the procedure will be shifted to S28.

In S28, the display dotted image data is displayed on the text box 24 of the print frame 22 displayed on the label making work area 20 of the edit display screen 11 via the print frame 22. The display dotted image data is composed of the two-dimensional code data stored in the display buffer 43A of the RAM 43 and display dotted pattern data of text data which is other than the two-dimensional code. And then, the procedure will be shifted to S13 of FIG. 12.

Returning to FIG. 12, the explanation of the process will be restarted at S13.

In S13, it is determined that data is input and there is a print operation. Here, the print operation includes clicking the print button 15E of the print property 15 by the user or selection the print menu of a sub menu of the file menu in the menu bar on the upper portion of the edit display screen 11. If it is determined that there is no print operation (S13:NO), it will be determined whether or not there is another operation. If it is determined that there is another operation, the process corresponding to the another operation will be executed. For example, the spin box 16D is operated, tape length will be set. After that, the procedure will be shifted to S5 and then subsequent process will be executed. If it is determined that there is an operation (S13:YES), the procedure will be shifted to S14 and the print process will be executed to make the label. After that, the procedure will be shifted to S5 and then subsequent process will be executed. In the print process, the dotted pattern to be used to make the label will be sent to the tape printer 101 and stored in print data storage area 43D of the RAM 43. The data stored in the print data storage area 43D is sent to the tape printer 101 via the communication I/F 45, and then will be printed on the roll printing medium 103A by the line thermal head 131 of the tape printer 101 every line of dot, thereby the label is made. Here, the number of the label is based on the number displayed on the number of copies spin box 15D of the print property 15.

A process in which the two-dimensional code label is made with the use of the print frame will be described with reference to FIG. 7 to 22. Here, FIG. 14 to 22 show sample images in the case where the two-dimensional code label is made with the use of the print frame.

At first, the process in which the two-dimensional code label 26 is made with reference to FIG. 7, 8, 12 to 15. As shown in FIG. 12, the edit display screen 11 is displayed after the RAM 43 is initialized or the like (S1) and the type of roll printing medium 103A mounted on the tape printer 101 is gotten (S2). As shown in FIG. 7, the image corresponding to the print frame 22, which is horizontally long, is displayed in the label making work area 20 (S3).

The text box 24, which is a rectangle with dotted line, is in the print frame 22. In initial state, the text box 24 is blank. Also, as shown in FIG. 7, the text of "LABEL123456789" will be input hereafter. The text box 24 has the handle 25 which is selectable. If the handle 25 is operated, the text box 24 will be enlarged or reduced.

The text of "12 mm" is displayed on the combo box 16G of the page property 16. The combo box 16G corresponds to the print frame 22 in the label making work area 20. The text of "AUTO" is displayed on the tape length spin box 16D. The spin box 16D corresponds to the print frame 22 in the label making work area 20.

The text of "NORMAL FORMAT" is displayed in the label format combo box 16A. The text of "12 mm" is set with the use of the tape width combo box 16 G of the page property 16 and the text of "auto" is set with the use of the tape length spin box 16D, so the text of "NORMAL FORMAT" is displayed. Also, to make the two-dimensional code label, the user may display the property screen of the two-dimensional code (not shown) by double-clicking the two-dimensional code button 21D, and sets the configuration including the size of the two-dimensional code and error-correction status beforehand (S3).

In this time, if the user clicks inside of the text box 24, the cursor (not shown) will be displayed in the data input process (S6 of FIG. 12). And then, if the user inputs the text of "LABEL123456789" in the input process, input text will be stored in the text memory 43F and the display buffer 43A of the RAM 43, and will be displayed in the text box 24 via the display device controller 50 (S8 of FIG. 7). Here, the user can input the text by dropping dragged text with the use of the mouse cursor 7A of the mouse 7 from the internet and the file stored in the hard disk mounted on the HDD 49. Here, the user can open the file stored in the hard disk mounted on the HDD 49 in the text box 24.

In this time, the user may highlight desired text of "123456789" among the text of "LABEL123456789" which was input in the text box 24 by operating mouse cursor 7A displayed on the edit display screen 11 with the use of the mouse 7. The data of the highlighted text of "123456789" will be stored in the work storage area 43G of the RAM 43 and the text will be highlighted in the text box 24 via the display device controller 50 (S10 in FIG. 14).

At this time, if the user one-clicks the two-dimensional code button 21D of the object dock 21 displayed on the edit display screen 11 by operating the mouse cursor 7A with the use of the mouse 7, the data of the text of "123456789" will be coded in the two-dimensional code based on the configuration including the size of the two-dimensional code and error-correction status which is set beforehand (S23).

At this time, if it is determined that the data of the text to be coded in the two-dimensional code will be stored within the two-dimensional code (S24:YES), the coded two-dimensional code and the text which is other than the two-dimensional code will be stored in the edit data storage area 43B of the RAM 43 (S25). The display dotted image data composed of display dotted pattern data of the added two-dimensional code data and text data not selected, will be stored in the display buffer 43A of the RAM 43 based on the added two-dimensional code and data of text which is not selected stored in the edit data storage area 43B of the RAM 43 (S27). The display dotted imaged data composed of the display dotted pattern data of the two-dimensional code data and the text data which is other than the text corresponding to the two-dimensional code, will be displayed on the text box 24 of the print frame 22 displayed on the label making work area 20 of the edit display screen 11 via the display controller 50 (S28 and FIG. 18). At this time, highlighted text on the selected portion will be deactivated (S26).

At this time, if the user clicks the print button 15E of the print property 15, the print process in which the label will be made. In the print process, dotted pattern to be sent and printed will be stored in the print data storage area 43D of the RAM 43. The data stored in the print data storage area 43D will be sent to the tape printer 101 via the communication I/F 45. And then, the tape printer 101 prints on the roll printing medium 103A every line of dot with the use of the line thermal head 131, the two-dimensional code label 27 which the text of "LABEL" and one two-dimensional code printed thereon will be made (FIG. 8 and S14). The size of the two-dimensional code label 27 is 12 by 22 millimeter. The one two-dimensional code is printed in the right side of the text of "LABEL". Here, the number of copies is displayed on the number of copies setting spin box 15D.

Making processes in which the two-dimensional code label 27 and 28 are made will be described with reference to FIG. 9, 10, 12, 13, 16 to 19. Processes executed in from start point to the point of text input, and processes executed in from the point of staring the print to the point of completing the label of the making process of the two-dimensional code label 27 and 28 are the same as the making process of the two-dimensional code label 26, so this explanation will be omitted.

If the user clicks the area in the text box 24 with the use of the mouse 7, the cursor (not shown) will be displayed on the text box 24 in the data input process (S6 in FIG. 12). And then, if the user inputs the text of "LABEL123456789abcdefghijk" in the input process, input text will be stored in the text memory 43F and the display buffer 43A of the RAM 43 and will be displayed in the text box 24 via the display device controller 50 (S8 of FIG. 16).

At this time, the user may highlight the text of "123456789abcdefghijk" to be coded in the two-dimensional code among the input text of "LABEL123456789abcdefghijk" in the text box 24 with the use of the mouse 7. The data corresponding to highlighted text of "123456789abcdefghijk" will be stored in the work storage area 43G of the RAM 43 and will be highlighted in the text box 24 via the display device controller 50 (S10 of FIG. 17).

At this time, if the user one-clicks the two-dimensional code button 21D of the object dock 21 displayed in the edit display screen 11 by operating the mouse cursor 7A with the use of the mouse 7, the highlighted text of "123456789abcdefghijk" will be coded in the two-dimensional code based on the configuration including the size and the error-correction status which are set beforehand (S23).

At this time, it is determined that the text to be coded in the two-dimensional code will not be coded within the two-dimensional code (S24:NO) and it is determined that the text to be coded can be coded in added two-dimensional code (S33:YES), the two-dimensional code will be added until the desired text can be coded based on the configuration including the size and the error-correction status of the two-dimensional code (S34). Data of added two-dimensional code and data of text which is not selected will be stored in edit data storage area 43B of the RAM 43 (S25). The display dotted image data composed of display dotted pattern data of the added two-dimensional code data and text data not selected, will be stored in the display buffer 43A of the RAM 43 based on the added two-dimensional code and data of text which is not selected stored in the edit data storage area 43B of the RAM 43 (S27). The display dotted imaged data composed of the display dotted pattern data of the two-dimensional code data and the text data which is other than the text corresponding to the two-dimensional code, will be displayed on the text box 24 of the print frame 22 displayed on the label making work area 20 of the edit display screen 11 via the display controller 50 (S28 and FIG. 18). At this time, highlighted text on the selected portion will be deactivated (S26). After that, processes, which are the same as print process where the two-dimensional code label 26 was executed, will be executed. Thereby, the two-dimensional code label 27 which the text of "LABEL" and two two-dimensional codes printed thereon will be made (see FIG. 9). The size of the two-dimensional code label 27 is 12 by 30 millimeter. The two two-dimensional codes are printed in the right side of the text of "LABEL".

If it is determined that the text to be coded in the two-dimensional code will not be coded within the two-dimensional code (S24:NO) and it is determined that the text to be coded in the two-dimensional code can not be coded even though the two-dimensional code is added (S33:NO), the procedure will be shifted to S35. In S35, the size of the two-dimensional code will be automatically changed based on the width of the roll printing medium 103A displayed on the tape width combo box 16G of the page property 16. If it is determined that the text to be coded in the two-dimensional code will be within one two-dimensional code (S36:YES), Data of added two-dimensional code and data of text which is not selected will be stored in edit data storage area 43B of the RAM 43 (S25). The display dotted image data composed of display dotted pattern data of the added two-dimensional code data and text data not selected, will be stored in the display buffer 43A of the RAM 43 based on the added two-dimensional code and data of text which is not selected stored in the edit data storage area 43B of the RAM 43 (S27). The display dotted imaged data composed of the display dotted pattern data of the two-dimensional code data and the text data which is other than the text corresponding to the two-dimensional code, will be displayed on the text box 24 of the print frame 22 displayed on the label making work area 20 of the edit display screen 11 via the display controller 50 (S28 and FIG. 19). At this time, highlighted text on the selected portion will be deactivated (S26). After that, processes, which are the same as print process where the two-dimensional code label 26 was executed, will be executed. Thereby, the two-dimensional code label 28 which the text of "LABEL" and two two-dimensional codes printed thereon will be made (see FIG. 10). The size of the two-dimensional code label 28 is 12 by 25 millimeter. The two two-dimensional codes are printed in the right side of the text of "LABEL". Here, the size of the two-dimensional code in FIG. 10 is slightly larger.

Making process in which the two-dimensional code label 29 is made will be described with reference to FIG. 11 to 13, to 22. Processes executed in from start point to the point of text input, and processes executed in from the point of staring the print to the point of completing the label of the making process of the two-dimensional code label 29 are the same as the making process of the two-dimensional code label 26, so this explanation will be omitted.

If the user clicks the area in the text box 24 with the use of the mouse 7, the cursor (not shown) will be displayed on the text box 24 in the data input process (S6 in FIG. 12). And then, if the user inputs the text of "LABEL123456789abcdefghijklmnopqrstuv . . . " in the input process, input text will be stored in the text memory 43F and the display buffer 43A of the RAM 43 and will be displayed in the text box 24 via the display device controller 50 (S8 of FIG. 20).

At this time, the user may highlight the text of "123456789abcdefghijklmnopqrstuv . . . " to be coded in the two-dimensional code among the input text of "LABEL123456789abcdefghijklmnopqrstuv . . . " in the text box 24 with the use of the mouse 7. The data corresponding to highlighted text of "123456789abcdefghijklmnopqrstuv . . . " will be stored in the work storage area 43G of the RAM 43 and will be highlighted in the text box 24 via the display device controller 50 (S10 of FIG. 21).

At this time, if the user one-clicks the two-dimensional code button 21D of the object dock 21 displayed on the edit display screen 11 with the use of the mouse cursor 7A by the mouse 7, the text of "123456789abcdefghijklmnopqrsttuv . . . " will be coded in the two-dimensional code based on the size and error-correction status of the two-dimensional code which is set beforehand (S23).

At the same time, if it is determined that data of the text to be coded in the two-dimensional code is not coded in the two-dimensional code (S24:NO), and it is determined that the two-dimensional code will be not added (S33:NO), the procedure will be shifted to S35. In S35, the size of the two-dimensional code will be automatically changed based on the width of the roll printing medium 103A displayed on the tape width combo box 16G of the page property 16. If it is determined that the text to be coded in the two-dimensional code will not be coded in one two-dimensional code even though the configuration including the size and error-correction of the two-dimensional code is changed based on the width of the roll printing medium 103A (S36:NO), the two-dimensional code will be added based on the configuration including the size and error-correction status of the two-dimensional code which is automatically set beforehand (S37). Data of added two-dimensional code and data of text which is not selected will be stored in edit data storage area 43B of the RAM 43 (S25). The display dotted image data composed of display dotted pattern data of the added two-dimensional code data and text data not selected, will be stored in the display buffer 43A of the RAM 43 based on the added two-dimensional code and data of text which is not selected stored in the edit data storage area 43B of the RAM 43 (S27). The display dotted imaged data composed of the display dotted pattern data of the two-dimensional code data and the text data which is other than the text corresponding to the two-dimensional code, will be displayed on the text box 24 of the print frame 22 displayed on the label making work area 20 of the edit display screen 11 via the display controller 50 (S28 and FIG. 22). At this time, highlighted text on the selected portion will be deactivated (S26). After that, processes, which are the same as print process where the two-dimensional code label 26 was executed, will be executed. Thereby, the two-dimensional code label 29 which the text of "LABEL" and two two-dimensional codes printed thereon will be made (see FIG. 10). The size of the two-dimensional code label 29 is 12 by 47 millimeter. The two two-dimensional codes are printed in the right side of the text of "LABEL". Here, the size of the two two-dimensional codes in FIG. 11 is slightly larger.

As mentioned above, in the two-dimensional code printing apparatus 1, to make the label which the two-dimensional code and the text printed thereon, the user can input all data with the use of the keyboard (for example) as though the user operates a word processor. And then, for example, the user highlights the portion of the displayed text in which the user wants to code in the two-dimensional code on the display device 4 with the use of the mouse 7 and the two-dimensional code and visible text is printed on the same printing medium. Also, the portion of the text, which is already existed (for example, the text data which is gotten from internet), can be coded in the two-dimensional code with the use of above data. That is, the user highlights the portion of the displayed text in which the user wants to code in the two-dimensional code by easily operation, and the two-dimensional code and visible text are printed on the same printing medium. Accordingly, one or more aspects of the disclosure can solve the problem of complex input method, which the user has to input the text to be printed with the two-dimensional code like the word processor and the user has to input data to be coded in the two-dimensional code in switched the two-dimensional code input mode. Also, one or more aspects of the disclosure can solve the problem of botheration, which the user has to consider alignment of the text and the two-dimensional code. Also, one or more aspects of the disclosure can solve the problem of complex input method, which to code the part of the text which is already existed, the user has to input all text again and input data to be coded in the two-dimensional code in switched the two-dimensional code input mode.

Also, the display condition of selected text by the mouse 7 is changed to distinguish from the display condition of not selected text (for example, selected text by the mouse 7 is highlighted), so the user can understand the text to be coded in the two-dimensional code.

Also, one or more aspects of the disclosure, when desired text data selected by the mouse 7 is coded in the two-dimensional code, if it is determined that desired text will not be selected within one two-dimensional code, the two-dimensional code will be added until the desired text data can be coded. Thereby, one or more aspects of the disclosure can so solve the problem, which the user has to change the size and the number of the two-dimensional code every time above circumstance occurs.

Also, the two-dimensional code printing apparatus has the printing medium discrimination sensors MS1 to MS5 which detect the width of the roll printing medium 103A on the tape printer 101, so when the text is coded in the two-dimensional code, if it is determined that the two-dimensional code will not printed within the width of the roll printing medium 103A, the size of the two-dimensional code will be changed based on the detected width of the roll printing medium 103A. Thereby, one or more aspects of the disclosure can solve the problem, which if the two-dimensional code is not within a width of the printing medium 103A is not within the two-dimensional code, the user has to change a size and the number of the two-dimensional code every time above circumstance occurs.

Also, the two-dimensional code printing apparatus 1 has the roll printing medium discrimination sensors MS1 to MS5 which detect the width of the printing medium 103A. Accordingly, when the text is coded is the two-dimensional code, if it is determined that the text will not be coded within the width of the two-dimensional code detected by the roll printing medium discrimination sensors MS1 to MS5, the size of the two-dimensional code will be automatically changed, in addition, the two-dimensional code will be added until all text will be coded in the two-dimensional code based on the changed size, which is as the standard size. Thereby, one or more aspects of the disclosure can solve the problem, which if the two-dimensional code, which is set, will not be coded within the width of the roll printing medium 103A or text data will not be coded within one two-dimensional code, the user has to change the size and the number of two-dimensional code every time above circumstance occurs.

The disclosure may be embodied in other specific forms without departing from the spirit or essential characteristics thereof. In the embodiment, the tape printer 101, which the roll printing medium 103A mounted thereon, is connected to the computer device, however, one or more embodiments are not so limited. For example, the printer, which the cut sheets with various sizes (for example, A4 size of A5 size) are mounted thereon, may be connected to the computer device 2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A two-dimensional code printing apparatus comprising:

a display device;

an input device that inputs various characters, numbers, symbols, or instructions by an operation of a user;

an input data storage device that stores data corresponding to the various characters, numbers, or symbols which are input by the input device;

a first display controller that displays the various characters, numbers, or symbols corresponding to the data stored in the input data storage device on the display device;

a selection device that selects a desired portion of the displayed characters, numbers or symbols displayed on the display device by voluntarily designating a range of the desired portion through the input instructions input by the user's operation of the input device;

a two-dimensional code conversion device that converts only the selected characters, numbers, or symbols by the selection device among the characters, numbers or symbols displayed on the display device into a two-dimensional code;

a transformed data storage device that stores data corresponding to not selected characters, numbers, or symbols by the selection device and data corresponding to the converted two-dimensional code by the two-dimensional code conversion device;

a second display controller that displays the characters, numbers, symbols not selected by the selection device, and the two-dimensional code corresponding to the stored data in the transformed data storage device on the display device; and a printer that prints the characters, numbers, symbols not selected by the selection device, and the two-dimensional code corresponding to the stored data in the transformed data storage device on a printing medium.

2. The two-dimensional code printing apparatus according to claim 1, further comprising:

a display condition change device that changes an appearance of the selected characters, numbers, or symbols by the selection device on the display device.

3. The two-dimensional code printing apparatus according to claim 1, further comprising:

a two-dimensional code addition device that adds the two-dimensional code until all of the selected characters, numbers, or symbols by the selection device are converted, if the selected characters, numbers, or symbols are not converted into one two-dimensional code.

4. The two-dimensional code printing apparatus according to claim 1, further comprising:

a width detection device that detects a width of the printing medium; and a two-dimensional code size change device that changes a size of the two-dimensional code based on the detected width of the printing medium by the width detection device, if the selected characters, numbers, or symbols by the selection device are not printed on the printing medium with the detected width of the printing medium by the width detection device.

5. The two-dimensional code printing apparatus according to claim 1, further comprising:

a width detection device that detects a width of the printing medium;

a two-dimensional code size change device that changes a size of the two-dimensional code based on the detected width of the printing medium by the width detection device, if the selected characters, numbers, or symbols by the selection device are not printed on the printing medium with the detected width of the printing medium by the width detection device; and a two-dimensional code addition device that adds the two-dimensional code until all of the selected characters, numbers, or symbols by the selection device are converted, if the selected characters, numbers, or symbols are not converted into one two-dimensional code.

6. A two-dimensional code printing apparatus comprising:

a display device;

an input device that inputs various characters, numbers, symbols, or instructions by an operation of a user;

an input data storage device that stores data corresponding to the various characters, numbers, and symbols which are input by the input device;

a transformed data storage device that stores data corresponding to the various characters, numbers, or symbols and data corresponding to one or more two-dimensional codes; and a processor programmed to:

(a) store the data corresponding to the various characters, numbers, and symbols which are input by the input device in the input data storage device, (b) display the various characters, numbers, and symbols corresponding to the data stored in the input data storage device on the display device, (c) select a desired portion of the displayed characters, numbers, or symbols displayed on the display device by voluntarily designating a range of the desired portion through the input instruction which is input by the user's operation of the input device, (d) convert only the selected characters, numbers, or symbols among the characters, numbers or symbols displayed on the display device into the two-dimensional code, (e) store data corresponding to not selected characters, numbers, and symbols and data corresponding to the converted two-dimensional code device in the transformed data storage device, (f) display the stored characters, numbers, symbols not selected by the selection device, and two-dimensional code corresponding to the stored data in the transformed data storage device, and (g) print the stored characters, numbers, symbols not selected by the selection device, and two-dimensional code corresponding to the stored data in the transformed data storage device on a printing medium by a printer.

7. The two-dimensional code printing apparatus according to claim 6, wherein the processor is programmed to change an appearance of the selected characters, numbers, or symbols on the display device.

8. The two-dimensional code printing apparatus according to claim 6, wherein the processor is programmed to add the two-dimensional code until all of the selected characters, numbers, or symbols, if the selected characters, numbers, or symbols are not converted in one two-dimensional code.

9. The two-dimensional code printing apparatus according to claim 6, wherein the processor is programmed to: (h) detect a width of the printing medium, and (i) change a size of the two-dimensional code based on the detected width of the printing medium, if the selected characters, numbers, or symbols are not printed on the printing medium with the detected width of the printing medium.

10. The two-dimensional code printing apparatus according to claim 6, wherein the processor is programmed to:

(h) detect a width of the printing medium, (i) change a size of the two-dimensional code based on the detected width of the printing medium, if the selected characters, numbers, of symbols are not printed on the printing medium with the detected width of the printing medium, and (j) add the two-dimensional code until all of the selected characters, numbers, or symbols are converted, if the selected characters, numbers, or symbols are not converted into one two-dimensional code.

11. A two-dimensional code printing method comprising:

a receiving step that receives various characters, numbers, symbols, or instructions;

a first storing step that stores data corresponding to the received characters, numbers, or symbols in an input data storage device;

a first displaying step that displays the various characters, numbers, or symbols corresponding to the data stored in the input data storage device on a display device;

a selecting step that selects a desired portion of the displayed characters, numbers, or symbols displayed on the display device by voluntarily designating a range of the desired portion through the input instructions in the receiving step;

a converting step that converts only the selected characters, numbers, or symbols in the selecting step among the characters, numbers or symbols displayed on the display device into a two-dimensional code;

a second storing step that stores data corresponding to not selected characters, numbers, or symbols in the selecting step and data corresponding to the converted two-dimensional code in a transformed data storage device;

a second displaying step that displays the characters, numbers, symbols not selected in the selecting step, and the two-dimensional code corresponding to the stored data in the transformed data storage device on the display device; and a printing step that prints the characters, numbers symbols, not selected in the selecting step and the two-dimensional code corresponding to the stored data in the transformed data storage device on a printing medium.

12. The two-dimensional code printing method according to claim 11, further comprising:

a display condition changing step that changes an appearance of the selected characters, numbers, or symbols in the selecting step on the display device.

13. The two-dimensional code printing method according to claim 1 further comprising:

a two-dimensional code adding step that adds the two-dimensional code until all of the selected characters, numbers or symbols in the selecting step are converted, if the selected characters, numbers, or symbols are not converted into one two-dimensional code.

14. The two-dimensional code printing method according to claim 11, further comprising:

a width detecting step that detects a width of the printing medium; and a two-dimensional code size changing step that changes a size of the two-dimensional code based on the detected width of the printing medium in the width detecting step, if the selected characters, numbers, or symbols in the selecting step are not printed on the printing medium with the detected width of the printing medium in the width detecting step.

15. The two-dimensional code printing method according to claim 11, further comprising:

a width detecting step that detects a width of the printing medium;

a two-dimensional code size changing step that changes a size of the two-dimensional code based on the detected width of the printing medium in the width detecting step, if the selected characters, numbers, or symbols in the selecting step are not printed on the printing medium with the detected width of the printing medium in the detecting step; and a two-dimensional code size changing step that adds the two-dimensional code until all of the selected characters, numbers, or symbols in the selecting step are converted, if the selected characters, numbers, or symbols are not converted into one two-dimensional code.

16. A tangible computer-executable medium having instructions stored thereon that, when executed by a processor, perform a method comprising the steps of:

a receiving step that receives various characters, numbers, symbols, or instructions;

a first storing step that stores data corresponding to the received characters, numbers, or symbols in an input data storage device;

a first displaying step that displays the various characters, numbers, or symbols corresponding to the data stored in the input data storage device on a display device;

a selecting step that selects a desired portion of the displayed characters, numbers, or symbols displayed on the display device by voluntarily designating a range of the desired portion through the input instructions in the receiving step;

a converting step that converts only the selected characters, numbers, or symbols in the selecting step among the characters, numbers or symbols displayed on the display device into a two-dimensional code;

a second storing step that stores data corresponding to not selected characters, numbers, or symbols in the selecting step and data corresponding to the converted two-dimensional code in a transformed data storage device;

a second displaying step that displays the characters, numbers, symbols not selected in the selecting step, and the two-dimensional code corresponding to the stored data in the transformed data storage device on the display device; and a printing step that prints the characters, numbers symbols, not selected in the selecting step and the two-dimensional code corresponding to the stored data in the transformed data storage device on a printing medium.

17. The tangible computer-executable medium according to claim 16, wherein the method further comprising:

a display condition changing step that changes an appearance of the selected characters, numbers, or symbols in the selecting step on the display device.

18. The tangible computer-executable medium according to claim 16, wherein the method further comprising:

a two-dimensional code adding step that adds the two-dimensional code until all of the selected characters, numbers or symbols in the selecting step are converted, if the selected characters, numbers, or symbols are not converted into one two-dimensional code.

19. The tangible computer-executable medium according to claim 16, wherein the method further comprising:

a width detecting step that detects a width of the printing medium; and a two-dimensional code size changing step that changes a size of the two-dimensional code based on the detected width of the printing medium in the width detecting step, if the selected characters, numbers, or symbols in the selecting step are not printed on the printing medium with the detected width of the printing medium in the width detecting step.

20. The tangible computer-executable medium according to claim 16, wherein the method further comprising:

a width detecting step that detects a width of the printing medium;

a two-dimensional code size changing step that changes a size of the two-dimensional code based on the detected width of the printing medium in the width detecting step, if the selected characters, numbers, or symbols in the selecting step are not printed on the printing medium with the detected width of the printing medium in the detecting step; and a two-dimensional code size changing step that adds the two-dimensional code until all of the selected characters, numbers, or symbols in the selecting step are converted, if the selected characters, numbers, or symbols are not converted into one two-dimensional code.

* * * * *